United States Patent
Wang

(10) Patent No.: US 12,157,570 B2
(45) Date of Patent: Dec. 3, 2024

(54) MACHINE FOR GENERATING LIFT USING COMPRESSED AIR AS POWER SOURCE AND OPERATION METHOD THEREOF

(71) Applicant: Lifeng Wang, Beijing (CN)

(72) Inventor: Lifeng Wang, Beijing (CN)

( * ) Notice: Subject to any disclaimer, the term of this patent is extended or adjusted under 35 U.S.C. 154(b) by 72 days.

(21) Appl. No.: 17/757,397

(22) PCT Filed: Sep. 30, 2020

(86) PCT No.: PCT/CN2020/119567
§ 371 (c)(1),
(2) Date: Jun. 15, 2022

(87) PCT Pub. No.: WO2021/120785
PCT Pub. Date: Jun. 24, 2021

(65) Prior Publication Data
US 2023/0011026 A1    Jan. 12, 2023

(30) Foreign Application Priority Data
Dec. 18, 2019    (CN) .......................... 201911311482.1

(51) Int. Cl.
*B64D 17/72*    (2006.01)
*B64C 11/04*    (2006.01)
(Continued)

(52) U.S. Cl.
CPC ............ *B64C 39/026* (2013.01); *B64C 11/04* (2013.01); *B64D 17/72* (2013.01); *B64D 27/16* (2013.01);
(Continued)

(58) Field of Classification Search
CPC . B64C 39/026; B64C 2025/008; B64D 17/72; B64D 33/00
See application file for complete search history.

(56) References Cited

U.S. PATENT DOCUMENTS

2003/0201362 A1    10/2003  Yang
2007/0095973 A1    5/2007   Challis
(Continued)

FOREIGN PATENT DOCUMENTS

CN    1183364 A    6/1998
CN    102806994 A    12/2012
(Continued)

OTHER PUBLICATIONS

International Search Report issued for International Patent Application No. PCT/CN2020/119567, dated Jan. 4, 2021 in 4 pages.
(Continued)

*Primary Examiner* — Brady W Frazier
*Assistant Examiner* — Shanna Danielle Glover
(74) *Attorney, Agent, or Firm* — Knobbe, Martens, Olson & Bear, LLP

(57) ABSTRACT

Disclosed is a personal flying machine using compressed air as power source, and an operation method thereof, the flying machine including a stationary rotor lift device in a cyclone duct, a seat frame and a compressed air supply device; wherein the stationary rotor lift device in a cyclone duct includes a cyclone duct, in-duct stationary rotors and in-duct compressed air artificial wind blowing ports; wherein the in-duct stationary rotor includes a stationary propeller hub and a plurality of stationary blades fixed connected around the stationary propeller hub and arranged radially; wherein the stationary blade is shaped as an airplane's wing having an airfoil, an angle of attack, a leading edge and a trailing edge; wherein the compressed-air supply device supplies compressed air to the in-duct compressed-air artificial wind blowing ports to eject airflows towards the leading edges of the stationary blades and form a cyclone to generate lift. The present application solves the problems of efficiency limitation, high cost, heavy structure and energy-environment (Continued)

issues related to the traditional personal flying machines of burning fossil fuels to do work, and overcomes their shortcomings and problems with the wingless or wing-movement to generate lift in relatively static air.

17 Claims, 5 Drawing Sheets

(51) Int. Cl.
  *B64C 39/02* (2023.01)
  *B64D 27/16* (2006.01)
  *B64D 33/00* (2006.01)
  *B64C 25/00* (2006.01)

(52) U.S. Cl.
  CPC ........ *B64D 33/00* (2013.01); *B64C 2025/008* (2013.01); *B64D 2201/00* (2013.01)

(56) References Cited

U.S. PATENT DOCUMENTS

| | | | |
|---|---|---|---|
| 2018/0079484 A1 | 3/2018 | Ross et al. | |
| 2018/0272856 A1* | 9/2018 | Manning | B64C 31/032 |
| 2022/0355922 A1* | 11/2022 | Filho | B64C 39/026 |

FOREIGN PATENT DOCUMENTS

| | | |
|---|---|---|
| CN | 104948234 A | 9/2015 |
| CN | 105649775 A | 6/2016 |
| CN | 206776297 U | 12/2017 |
| CN | 110963035 A | 4/2020 |
| CN | 211308973 U | 8/2020 |
| WO | 2016/195564 A1 | 12/2016 |
| WO | 2017/151029 A1 | 9/2017 |
| WO | 2018/182475 A1 | 10/2018 |

OTHER PUBLICATIONS

Hawkswell et al., *The Effect of Propeller Spacing on the Performance of a Blown Wing for an Electric Regional Aircraft*, AIAA 2024-1537, Jan. 4, 2024.

Long at al., *An Experimental Investigation of a Blown-Flap Wing*, AIAA Aviation Forum 2021, Aug. 2021.

Saeed et al., *Exploring the aerodynamic characteristics of a blown annular wing for vertical/short take-off and landing applications*, Proceedings of the Institution of Mechanical Engineers, Part G: Journal of Aerospace Eng., May 16, 2011.

Wikipedia entry on "Blown Flaps" https://en.wikipedia.org/wiki/Blown_flap (accessed Jul. 30, 2024).

Youtube video: 8 personal flying machines (Aug. 12, 2021) https://www.youtube.com/watch?v=qdEAN8ef3Wk.

* cited by examiner

MACHINE FOR GENERATING LIFT USING COMPRESSED AIR AS POWER SOURCE AND OPERATION METHOD THEREOF

CROSS-REFERENCE TO RELATED APPLICATION

The present application is the U.S. National Phase under 35. U.S.C. § 371 of International Application PCT/CN2020/119567, filed Sep. 30, 2020, which claims priority to Chinese patent application No. 201911311482.1 filed on Dec. 18, 2019, entitled "Personal Flying Machine Using Compressed Air as Power Source and Operation Method Thereof," which are hereby incorporated by reference in their entirety.

FIELD OF TECHNOLOGY

The present application relates to the technical field of compressed air and aviation flight, and in particular provides a personal flying machine using compressed air as a power source and an operation method thereof.

BACKGROUND

Since ancient times, human beings have dreamed of "personal flight in the air", which may be seen in myths and murals of the past ages. However, human beings have limited physical strength, which is insufficient to overcome their body weight and thus leap into the air, and even a world champion is only able to jump a little more than two meters followed by an immediate landing. A human body is not born with wings that can make use of aerodynamics to generate lift, unlike birds soaring in the sky with their wings. Until recent decades, with the progress of science and technology, intelligent human beings are gradually bringing this dream into reality, highlighted by the introduction of personal flying machines.

One of characteristics of said personal flying machines is the capability to tie, carry or wear equipment with a certain thrust and lift on a human body, so as to propel and drive the human body into the air and fly in the atmosphere.

Among some of the personal flying machines, a jet engine (such as a rocket engine) is provided in the equipment tied to the back of a human body, which is a kind of internal combustion engine that may output thrust. When the engine is working, the fuel is burnt to produce high-temperature and high-pressure gas to eject from the nozzle. Thrust is produced by gas ejection, lifting the human body and the equipment (engine and its fuel) into the air. Such equipment is called jet pack, rocket belt or rocket pack, for instance, the rocket belt appeared in the air over the opening ceremony of the Los Angeles Olympic Games in 1984, or the GoFast, a jet pack developed by Jetpack International and debuted in China on Jul. 11, 2015.

Other personal flying machines are the equipment, worn on a human body and carried on one's back, including a jet engine and a structure similar to the wings of an aircraft, which are called jet wing packs, jet-auxiliary wing outfits, etc., such as Yves Rossy's jet wingpack, which undergone many test flights since 2004, Visa Parviainen's jet-assisted wingsuit introduced in 2005, as well as Fritz Unger's jetpack with rigid wings being designed and developed as of 2013.

There are also some of the personal flying machines which are the equipment, tied to a human body and carried on one's back, including a fuel engine and its driven rotor/propeller. The engine is an internal combustion engine configured to output torque by burning the fuel to produce high-temperature and high-pressure gas as a working medium to drive the rotor/propeller to rotate in the air, thereby generating lift and driving the human body to fly. This type of flying machine is known as backpack helicopter, flying pack, or sometimes also called jet pack, such as the "single-man helicopter" XNH-1 developed by US military in the 1950s. or the Martin jetpack developed by the Martin Aircraft Company in New Zealand in recent years.

The discussion of this background technology will mainly involve the above-mentioned types of personal flying machines, hereinafter referred to as personal flying machines in the prior art.

I. Problems and Shortcomings of Engines in Personal Flying Machines in the Prior Art (I) Engines Relying on Burning Fuel to Generate High-Temperature and High-Pressure Gas for Work are Facing the Problems of Energy Depletion and Environmental Pollution.

All of the engines used in the personal flying machines in the prior art for providing power, whether the internal combustion engines that output thrust (such as rocket engines, aviation jet engines), or those that output torque (such as gasoline engines, diesel engines), rely on fuel combustion to produce high-temperature and high-pressure gas as power, while "fuel combustion" results in the common problems of energy depletion and environmental pollution that mankind is facing. According to authoritative reports, most fossil energy sources will be exhausted in this century, and the combustion of fossil fuels will add significant amounts of greenhouse gases to threaten the global ecology. Such a way to obtain power is limited to a small number of initial test flights, with a small amount of energy consumptions and emissions to be of little concern. However, there is a consideration in transportation aspect for the public's expectations of flying to work. For example, the aforementioned peculiar personal flying machines in the air over Los Angeles Olympic Games in 1984 attracted the eyes of 2 billion people, a well-known question "Jetpacks, why aren't we all flying to work?" was popular in the society. In other aspects such as military and national defense, police and firefighting, search and rescue, commerce and industry, and even sports and entertainment, many practical application potentials exist. Once the personal flying machines in the prior art will be widely used, the problems of energy depletion and environmental pollution of using engines relaying on combustion of fuels for power will be highlighted. Therefore, the development of clean energy must be considered at present.

(II) Engines Relying on Burning Fuel to Generate High-Temperature and High-Pressure Gas for Work have the Disadvantages Related to Combustion High-Temperature.

The internal combustion engine in personal flying machines in the prior art makes use of fuel combustion to produce the high-temperature and high-pressure gas to do work. The amount of work done is not directly related to the temperature of the gas but to the pressure of the gas. However, the high-pressure gas used to do the work must have a high temperature as produced by fuel combustion. But the high temperature of the gas has the following disadvantages.

1. The Combustion Gas is Hot, and so is the Exhaust Gas, Taking Away a Lot of Heat Energy, so that the Fuel Energy is not Fully Utilized.

Wherein, the high-temperature exhaust gas emitted from the nozzle of the rocket engine can reach thousands of degrees Celsius, so that the energy utilization rate is not high. The efficiency of general gasoline engine (efficiency 30±%) and diesel engine (efficiency 40±%) are low, also related to the emission of a large amount of waste heat produced at the same time of fuel deflagration to produce high-temperature and high-pressure gas.

2. The High Temperature of the Gas Limits the Engine's Ability to Generate and Use High-Pressure Gas to do Work.

The work capacity of an internal combustion engine is directly related to the level of gas pressure. The high temperature of the gas will cause the temperature increase in the related parts such as the combustion chamber, exhaust pipe and other parts which generate, contain and discharge the gas. As told by the common knowledge of material mechanics, the ability of the materials constituting these parts to withstand pressure decreases as their temperatures increase, especially at high temperature. It is obvious that the high temperature of the combustion gas will limit the design of the engine working pressure and the improvement of the engine performance and power.

For example, the combustion temperature of conventional jet engine fuel in the combustion chamber may reach about 3500K (approx. 5800° F.), often exceeding the melting point of materials made from the nozzle and combustion chamber (except graphite and tungsten). It is necessary to ensure that these materials will not be burnt, melted or boiled. The combustion chamber is under a certain circumferential stress. Due to the high temperature of working environment, the tensile strength of its structural materials is significantly reduced, which also causes the design pressure that it may bear to be limited to a certain extent.

3. There are Safety Risks Due to High Temperature of the Gas.

The engine body heated by the high-temperature gas, especially the high-temperature gas itself as emitted, may burn the human body. For example, as for the JB-10 jetpacks launched by JetPack Aviation in recent years, the pilots are required to wear a specific fire-proof wear, including fire-proof underwear, flame retardant trousers, etc. The high-temperature gas damage to the surrounding people and the environment should also be prevented.

4. The Engine Parts Heated by the High-Temperature Gas Need to be Cooled in Time, and Equipping a Cooling System Makes the Engine Structure Heavier.

For the engine that burns fuel to produce high-temperature gas, it is necessary to design a cooling system specifically on its specific part to cool the blazing components related to the production, containment and discharge of high-temperature gas, effectively decrease the temperature to improve the operating environment of the engine, ensure its reliability under various working conditions, and prevent the safety risks due to high temperature of gas. However, equipping a cooling system makes the structure of the flying machine heavier. For a traditional personal flying machine, it is necessary to overcome the gravity of a human body and the internal combustion engine with complex structure, as well as the gravity of all amount of required fuel (the utilization rate of the fuel itself is not high), plus the gravity of a cooling system, which is disadvantageous to the light-weight of the flying machine, and thus to the optimization of its flight dynamics performance.

5. The High Temperature of the Gas is Related to the Increase in the Engine Cost.

The high-temperature resistant and high-pressure resistant material is more expensive, and the high temperature safety protection and necessary cooling facilities will increase capital investment.

II. The Problems and Shortcomings of the Personal Flying Machines in the Prior Art in the Use of "Wings" to Generate Lift It is well known that aircrafts heavier than air, whether fixed-wing aircraft (such as airplanes) or rotary-wing aircraft (such as helicopters), are equipped with wings having a certain airfoil (or wing profile) and angle of attack, and generate lift through the relative movement of air and the wings and overcome its own gravity (in this description, the own gravity includes those of an aircraft, its occupant, and the carried fuel, the same below) to lift into the air and fly in the atmosphere. A formula for calculating a lift may be expressed as:

$$Y = \frac{1}{2} C_y \rho v^2 S$$

where
Y=lift
$C_y$=lift coefficient (related to airfoil, angle of attack, etc.)
ρ=air density
v=air velocity (namely the speed of the relative movement of air and wings, the square of which is proportional to the lift)
S=wing area.

Therefore, when the lift coefficient (related to airfoil, angle of attack, etc.), air density, and wing area are relatively fixed, the air velocity (the speed of the relative movement of air and wings) becomes the key factors to determine the wing lift. When the air velocity reaches a certain level, a lift that may overcome the own gravity is generated.

The problems and shortcomings of the personal flying machines in the prior art in the use of "wings" to generate lift are briefly described as follows:

(I) Some Personal Flying Machines being Wingless

The aforementioned rocket belt that appeared in the air over the opening ceremony of the Los Angeles Olympic Games in 1984, as well as the jet pack GoFast that was developed by Jetpack International and debuted in China on Jul. 11, 2015 are both wingless personal flying machines. Another example is the JB-9 wingless jetpack displayed by Jetpack Aviation in front of the Statue of Liberty in Upper New York Bay on Nov. 3, 2015. There are many examples of the wingless personal flying machines in the prior art, just to name a few. As a kind of personal flying machines in the prior art, they have not been designed to fly in a microgravity environment outside the atmosphere, but as heavier-than-air aircraft for controlled flight in the atmosphere. They are lifted off by the thrust formed by the high-temperature and high-pressure gas produced by the combustion of fuel in the internal combustion engine that outputs thrust such as rocket engines or other jet engines, but cannot get the aerodynamic force corresponding to the wings to overcome its own gravity when flying in the atmosphere, thence their stagnation time is extremely short, often calculated in seconds. The problems and shortcomings of this part of personal flying machines in using "wings" to generate lift are that they are wingless.

(II) Regarding Winged Personal Flying Machines

1. Personal Flying Machines with Wings Similar to Those of Airplanes

This type of personal flying machines, worn on a human body and carried on one's back, are equipped with a jet engine (an internal combustion engine to output thrust) and a structure similar to the wing of an airplane. For example:

(1) Yves Rossy's Jet Wingpack

Yves Rossy, a former Swiss military and commercial pilot, wore a heat-resistant suit (configured to protect him from being burned by ejected high-temperature gas) including four small jet engines that burn kerosene and rigid aircraft-type carbon fiber folding wings (with a wingspan of ca 2.4 meters), and jumped down from a high-flying airplane. After being accelerated by a free fall, he could fly horizontally for several minutes, followed by landing with a parachute. On Jun. 24, 2004, he successfully completed his maiden flight in Geneva, Switzerland. After that, he has made many free-fall test flights and performances in Switzerland, Spain, France, the United Kingdom, and the United Arab Emirates.

(2) Visa Parviainen's Jet-Assisted Wingsuit

On Oct. 25, 2005, in Lahti, Finland, Visa Parviainen wore a wingsuit equipped with two small turbojet engines, jumped from a high-altitude hot air balloon, and achieved a horizontal flight of ca 30 seconds.

(3) Fritz Unger: Jetpack with Rigid Wings

As of 2013, German Fritz Unger was developing a jetpack, also known as Skyflash, which had rigid wings with a wingspan of ca. 3.4 meters and four chassis wheels fitted on his chest and abdomen, and were designed to use two diesel-fueled turbojet engines to boost takeoff from the ground. Taking into account that usually aircraft need to accelerate for several kilometers from the airport runway before taking off, even shorter ones need to roll for one or two kilometers (for jet aircraft), and an aircraft carrier-based carrier aircraft needs to accelerate and roll for more than 100 meters when taking off from the smooth flight deck by steam/electromagnetic catapult, or taking off with the ski jump over the ship's bow slipping deck (only a few countries in the world can do it). It can be imagined that in order for this personal flying machine to make use of the above-mentioned rigid wings with a wingspan of 3.4 meters, four chassis wheels on the chest and abdomen, and two jet engines to assist thrust to take off from the ground, questions need to be answered include: how long a runway needs to be run, what kind of runway, what kind of assist device, and whether it can reach a safe ground clearance speed.

Just because it is really difficult to run straight on the ground to a fast enough speed while carrying the wings on one's back, there are test flights to get on an airplane or a hot air balloon to jump from a high altitude to perform free fall acceleration. The above-mentioned personal flying machine with wings similar to airplanes is far from the personal flying machine expected by mankind to be convenient to use and convenient for traffic.

2. Personal Flying Machine with Rotor/Propeller

This type of personal flying machine is the equipment tied to a human body and carried on one's back, including an engine and a rotor/propeller.

The engine makes use of high-temperature and high-pressure gas produced by burning fuel as a working medium. It is an internal combustion engine capable of outputting torque and is configured to drive the rotor/propeller to rotate in the air. (Rotor-wing flying machines have the characteristics incomparable with those of fixed-wing flying machines cannot match, such as low level flight, hovering, flying left and right, etc. From the principle of generating power, both of the rotor and propeller generate power through rotation. Both of the rotor and propeller consist of multiple blades, number of which is generally less than 8 (for single row). In essence, each blade is a rotating wing with an airfoil and an angle of attack, and it rotates in the air to generate lift).

(1) Personal Flying Machines with Rotor

Rotor, as the main rotating component to generate lift for rotor aircraft such as helicopters and rotorcrafts, consists of a hub and several blades. The hub is a component connecting the blades and the rotor shaft. The blade has a certain airfoil and angle of attack like a slender wing, being a key component for generating lift. The engine drives the blades to rotate by driving the rotor shaft-hub. The rotation of the blades accelerates, the air velocity (the speed of relative movement of the air and the blades like rotating wings) increases, and thus the lift increases (the square of the air velocity is proportional to the lift); when the rotating speed of the blade reaches a certain value, the lift is increased enough to overcome its own gravity, and the personal flying machine with the rotor takes off. The "single-man helicopter" XNH-1 developed by the US military in the 1950s belongs to this type of personal flying machines.

(2) Personal Flying Machines with Propeller

Propellers may be divided into marine propellers and air propellers. All propellers mentioned in this description refer to air propellers. While the names of rotors and propellers are different, the principles of the two are almost the same. The propeller also consists of a propeller hub located in the center thereof and multiple propeller blades around it. Its blades also have airfoil (wing profile) and angle of attack, which may be regarded as multiple twisted slender "wings" mounted on the hub. The hub is connected to the engine shaft and may be driven by the engine to rotate, thereby driving a plurality of the blades mounted on the hub to rotate in the air. The rotation of the blades accelerates, the air velocity (the speed of relative movement of the air and the blades like rotating wings) increases, and the lift increases (the square of the air velocity is proportional to the lift). When the rotating speed of the blades reaches a certain value, the lift is increased enough to overcome its own gravity, the personal flying machines with the propeller takes off into the air. In recent years, Martin Jetpack developed by the Martin Aircraft Company in New Zealand belongs to this category of personal flying machines with propeller. Here, it is necessary to add a description of a prior art technology called ducted fan. A ducted fan is a propeller (or rotor) installed in a cylindrical shield or duct. Ducted fans can generate lift more effectively, because the shroud or duct surrounds the outer periphery to reduce the loss of air flow from the tip of the rotating blades. Moreover, the design of the blades in the surrounding structure reduces the risk of the blades hitting the ground personnel during flight, and shields the blades noise. A Martin Jetpack is provided with two symmetrical ducted fans on the left and right.

A personal flying machine with rotor/propeller lifts off from the ground, without running on a long runway or jumping from a high altitude. It can take off and land vertically, and hover in the air, especially the use of ducted fans can generate lift more effectively, and extend the time staying in the air (some up to about half an hour). However, an internal combustion engine with torque output is required to drive the blades to rotate through a transmission mechanism, resulting in doing more work, consuming a lot of fossil energy, polluting the environment, and the problems related to the high temperature of the gas, such as limited energy efficiency, potential safety risks, increased weight and complex structure, and high cost.

Engines have successively gone through the development stages of external combustion engine and internal combustion engine. From Watt's invention of the steam engine (external combustion engine) in 1776, setting off the industrial revolution, to modern internal combustion engines to output torque (such as gasoline engines and diesel engines) and those to output thrust (such as rocket engines, aviation jet engines), widely used in aerospace, land and sea, all rely on high-temperature and high-pressure gas produced by combustion to do work (fossil fuels, slowly formed in the ground through thousands of years of deposition, are instantly converted into high-temperature and high-pressure gas for a moment of combustion). After having analyzed the direct effects of "high temperature" and "high pressure", people in the field know that the effect of "high temperature" is mainly based on the increase in gas pressure in the engine based on the principle of thermodynamics, while the effect of "high pressure" is directly related to mechanical work. The level of the pressure of gas determines the size of torque or thrust to be output. Both energy and environmental issue are the two most serious issues that have plagued the global engine industry for a long time. For this reason, many countries have triggered the investigation, research and development of engines that directly use high-pressure gas compressed air to do work. For example, there have been a series of press releases and result demonstrations involving compressed air engines and compressed-air cars driven by their output torque over the years, such as French MDI (Motor Development International), India Tata Motors, using compressed air pressurized by the electric air compressor outside the car into an on-board compressed air tank as the energy source. A compressed air vehicle in the prior art can carry a compressed air tank of ca. 300 liters, the tank being filled with compressed air at a pressure of 30 MPa, with the energy equivalent to ca. 51 MJ (the feasible driving distance is about 300 kilometers, and the maximum speed can reach 105 km/h).

The reasons why above-mentioned compressed air engines and compressed air vehicles have not been widely used are generally mistaken for safety issue (such as explosion risk) or sealing problems (such as air leakage), but neither is the case.

As a mature industry, pressure vessels have been formulated with safety codes. In the safety codes, the legal working pressure is limited to be less than 40% of the rupture pressure of a gas storage device, and the safety factor is at least 2.5 (that is, the ratio of ultimate stress to allowable stress is greater than or equal to 2.5). For example, the safety factor of the American TOBUL 138 MPa piston accumulator is 4. Moreover, the carbon fiber of the compressed air storage device itself is brittle and may be split under a large enough pressure, but it will not cause any shrapnel, in such a case there will be no dangerous situation of fragments and high-pressure gas splashing, and the safety is relatively good.

As for the sealing aspect, valve sealing technology is more reliable with the advancement of pneumatic transmission technology. There is a comparison in the field, that is, a rate at which the compressed air storage device leaks is slower than that at which a battery depletes its power automatically over time when it is not used.

Although compressed air engines need continuous R&D and innovation like anything novel, people in the field know that the key problem affecting the wide application of compressed air engines is that 90% of the electric energy consumed by electric air compressors is converted into heat, which is difficult to be recovered, resulting in low overall efficiency. At the same time, there are two other thorny energy issues around the world: (1) off-peak electricity during night (approximately 24% of the total electricity) is difficult to be used and often wasted, and the power sources such as wind power and solar energy are not easy to store; (2) the demand for central heating continues to expand, and heating consumes a lot of fossil fuels, which is disadvantageous to global energy security and climate change.

A granted invention patent "SYSTEM ECONOMICALLY USING COMPRESSED AIR AS AN AUTOMOBILE POWER SOURCE AND METHOD THEREOF" U.S. Pat. No. 10,252,607B2, No. ZL 201510289802.3 and PCT/SE2016/000030, invented by the applicant of the present invention in 2015 discloses a kind of "compressed air production, storage and supply mechanism", making use of the off-peak electricity at night and the power sources that are not easy to store such as wind power and solar energy to produce/store high-pressure/ultra-high-pressure compressed air, simultaneously recycling the accompanying heat energy (approximately 90% of the electric energy consumed) for central heating, which can not only solve above two thorny energy issues by utilizing the off-peak electric energy at night and recycling the accompanying heat for clean central heating, and but also solve the problem that the production of compressed air is high in cost. The above-mentioned patent also discloses an innovative compressed air engine with output torque for use in compressed air vehicles. In 2016, the applicant of the present invention had this inventor has got another invention patent "SYSTEM OF USING COMPRESSED AIR AS A FORCE SOURCE AND METHOD THEREOF; AIRPLANE" U.S. Pat. No. 11,149, 633B2, ZL 201610125197.0 and PCT/SE2017/000005, which also discloses "compressed air production and supply device" having improved and expanded than the "compressed air production, storage and supply mechanism" in the previous patent, and also has the same advantages as mentioned above. The above-mentioned patent also discloses another type of compressed air jet engine to outputs thrust, for utilizations in airplanes, rockets, trains, submarines, etc. It should be mentioned here that the first and third auxiliary jet engines, respectively disposed in front of the aircraft head and front of the wings have the functions of reducing the air resistance and increasing the wing lift.

In this way, the key problem affecting the wide application of compressed air engines, that is "90% of the electric energy consumed by the electric air compressor is converted into heat, and the overall efficiency is not high", can be solved economically and environmentally. At the same time, the compressed air engine configured to output torque is innovated, especially the advent of the compressed air jet engine configured to output thrust makes it possible to directly use high-pressure/ultra-high-pressure compressed air to do work without combustion. The compressed air engines configured to output torque or thrust may be widely applied in the sky, land and sea. Thence the transition of the engines from external/internal combustion engines based on traditional technologies to "non-combustion engines" becomes possible.

According to the lift formula, when the lift coefficient (related to airfoil, angle of attack, etc.), air density and wing area are relatively fixed, the air velocity (speed of relative movement of air and wing) becomes a key factor to determine the wing lift. In this regard, there is a very important concept in aerodynamics "wing being stationary while air being moving" and "air being stationary while wing being moving" are essentially the same. The real key lies in the speed of the relative movement of the wing and air.

For personal flying machines in the prior art with wings similar to airplanes or those with rotor/propeller, the above-mentioned air velocity (speed of relative movement of air and wing) is generated by "air being stationary while wing being moving", that is, the airplane-like wings on one's back are moving in a straight line at high speed in the air, or the blades of a rotor/propeller like airplane wings (with airfoil and angle of attack) are rotating at high speed relative to the still air, it may need to run on a long runway or jump from high altitude, or to let internal combustion engine output torque to drive the blades to rotate through the transmission mechanism, in which more work is done, resulting in large energy consumption and environment pollution. Therefore, it is reasonable to assume that if the air velocity (speed of relative movement of air and wing) is generated from "wing being stationary while air being moving", the aforementioned various technical problems related to the wing movement may be avoided. Then, the technical problems related to air movement will be faced, the most important of which is how to generate high-speed airflow, obviously one cannot rely on natural wind but "artificial wind".

Traditional jet engines for aircrafts are usually located at the rear of the fuselage, under the wings or other conventional installation positions. In the 1970s, the United States and the former Soviet Union successively launched a kind of aircraft with on-wing jet engines, respectively an experimental Boeing YC-14 (canceled for various reasons) and Антонов Ан-72, and the air flow ejected by such engines directly blows through the upper surfaces of the wings to accelerate the air flow on the upper surfaces of the wings and increase the lift force, thereby realizing short-distance take-off and landing. This technology is collectively referred to as the AH-72 technology below. The third auxiliary jet engines among the compressed air jet engines disclosed in the above-mentioned invention patent "SYSTEM OF USING COMPRESSED AIR AS A FORCE SOURCE AND METHOD THEREOF; AIRPLANE" invented by the applicant of the present invention is symmetrically arranged in front of the upper surfaces of the wings on both sides to eject high-speed airflow backwards (the same direction as the airflow towards the wings when the airplane taxiing to take off), accelerating the air velocity (accelerating the speed of the relative movement of air and wings). According to the lift formula, Bernoulli's principle, and Newton's Third Law, as well as the Coanda Effect, it has the effect on improving the wing lift. In addition, AH-72 technology is compared with the third auxiliary jet engines in the above-mentioned invention patent. Now, some of the different technical features of the two are coped as follows:

(1) The AH-72 engine is powered by gas generated by fuel combustion (belonging to an internal combustion engine), and the third auxiliary air engine of the present invention is powered by compressed air (belonging to a "no-combustion engine");
(2) The high-temperature gas ejected by the AH-72 engine may result in a certain degree of burning corrosion and structural thermal fatigue on the surfaces of the wings (the material-requirement for the wing is too high, and the cost is too expensive), whereas the high-speed airflow ejected by the third auxiliary air engine of the present invention does not result in the above-mentioned ablation and damage on the surfaces of the wings;
(3) The AH-72 engines are arranged above the wings, and the third auxiliary air engines of the present application are arranged in the front of the leading edges of the wings;
(4) The effect of the AH-72 engines on the lift force of the wings is mainly produced on the upper surfaces of the wings, whereas the effect of the third auxiliary air engines of the present application on the lift force of the wings is produced not only on the upper surfaces of the wings but also on the lower surfaces of the wings with certain angles of attack, so the efficiency is higher.

Certainly, the above-mentioned patents of the this inventor have disclosed a type of compressed air jet engines, the temperature of the gas ejected from its nozzle is normal temperature or even slightly lower than normal temperature (because the volume of compressed air expands after being ejected, it can be accompanied by a slight drop in temperature, but not an increase), and will not ablate or damage the surface of the corresponding moving carrier like the high-temperature gas ejected from the nozzle of a traditional jet engine. However, they are designed as a kind of compressed air jet engines to output thrust as the main purpose, there is still a gap between high-speed airflow and the concept of "artificial wind" in the control of flow direction, flow amount and flow velocity. In 2017, the applicant of the present invention had an authorized invention patent "COMPRESSED AIR ARTIFICIAL WIND SYSTEM AND METHOD THEREOF, FIREFIGHTING EQUIPMENT" U.S. Pat. No. 11,149,633B2, ZL 201720324669.5 and PCT/SE2018/000002)", which discloses a compressed air artificial wind device. It can be used as a reference to solve the need for "artificial wind" mentioned above, that is, if the air velocity (the speed of the relative movement of air and wing) as a key factor of lift is generated from "wing being stationary, while air being moving", it will face the technical issues related to air movement in need to be resolved.

SUMMARY

In view of the problems in the prior art, it is an objective of the present application to provide a personal flying machine using compressed air as a power source and operation method thereof, so as to not only solve the problems of limited efficiency, high cost, heavy structure, and energy-environmental issues related to doing work by high-temperature and high-pressure gas produced from burning of fossil fuels of personal flying machines in the prior art, but also address disadvantages and issues related to the lifting force of personal flying machines either wingless or winged movement in relatively still air to generate lift.

According to an embodiment of the present application, a personal flying machine using compressed air as a power source is provided, including a stationary rotor lift device in a cyclone duct, a seat frame, and a compressed air supply device; the stationary rotor lift device in a cyclone duct and the compressed air supply device are respectively installed on the seat frame; wherein the stationary rotor lift device in a cyclone duct includes a cyclone duct, an in-duct stationary rotor, and an in-duct compressed air artificial wind blowing ports, the in-duct stationary rotor and the in-duct compressed air artificial wind blowing ports are fixedly installed in the cyclone duct in a same working horizontal section, and the in-duct stationary rotor includes a stationary propeller hub and a plurality of stationary blades fixedly connected around the stationary propeller hub and arranged radially; the stationary blade is shaped like a wing and has an airfoil, an angle of attack, a leading edge and a trailing edge, and the trailing edge of each stationary blade is opposite to the leading edge of another stationary blade; wherein the stationary rotor lift device in a cyclone duct is fixedly installed on each of both sides of the seat frame in a symmetrical and torque-balanced manner, and the compressed air supply device supplies compressed air to the in-duct compressed air artificial wind blowing ports, so that the in-duct compressed air artificial wind blowing ports are configured to jet airflows toward the leading edge of the stationary blades.

According to an embodiment of the present application, the cyclone duct is a gas channel including a cyclone cylinder and a gradually widening lower opening and vertically arranged on each of both sides of the seat frame; wherein in the cyclone cylinder, the outer peripheral ends of the stationary blades are fixedly connected to the cyclone cylinder inner wall; the cyclone cylinder is provided therein with a lift-increasing device including a plurality of additional stationary rotors and in-duct fixed wings, and the additional stationary rotors and the in-duct fixed wings are respectively fixedly arranged on the cyclone cylinder inner wall between the in-duct stationary rotor and the gradually widening lower opening.

According to an embodiment of the present application, the seat frame includes a back board, a seat board, armrests and supporting legs; wherein the back board is provided with a buckle mechanism for installing the compressed air supply device on a back side, and provided with shoulder straps and abdominal strap for binding a human body to the back board on a front side, and a bottom of the back board is connected with the seat board; the armrests are provided with one on the left and the other on the right, and a rear end of each armrest is provided with rotating connection to connect rotatably connected with both sides of the back board or the seat board; a plurality of supporting legs are provided, and respectively extend downward and outward from a lower part of the back board or the seat board.

According to an embodiment of the present application, each supporting leg includes a piston rod type column and a cylinder type sleeve sleeved on the piston rod type column; an upper end of the piston rod type column is a piston which is slidable in the cylinder type sleeve, and a lower end of the piston rod type column is a ground end of supporting leg, and an upper end of a cylinder wall of the cylinder type sleeve is connected to the lower part of the back board or the seat board through a movable joint; an upper end of an inner cavity of the cylinder type sleeve is provided with a inflation valve and an exhaust valve, and a lower end of the inner cavity of the cylinder type sleeve is provided with an end port for allowing the piston rod type column to smoothly extend into or out of the cylinder type sleeve and restraining the piston from sliding out while the piston rod type column moves up and down with the piston in the cylinder-type sleeve; wherein a left foot pedal bracket and a right foot pedal bracket are respectively provided on left and right sides of a lower end of the cylinder type sleeve of the supporting leg extending forward and downward, i.e., a front supporting leg;
  wherein the compressed air supply device is connected with the inflation valve to supply compressed air to the cylinder type sleeve.

According to an embodiment of the present application, the compressed air supply device includes a compressed air storage device; the compressed air storage device includes a plurality of air storage pipes, and manifolds located at both ends of the air storage pipes, one end of each air storage pipe is provided with a pipe inlet and a pipe inlet valve, and the other end of each air storage pipe is provided with a pipe outlet and a pipe outlet valve; wherein the manifold communicating with the pipe inlets of the plurality of air storage pipes is an inlet manifold, and the manifold communicating with the outlet pipes of the plurality of air storage pipes is an outlet manifold; the inlet manifold is provided with a manifold air inlet and a manifold inlet valve, and the outlet manifold is provided with a plurality of manifold air outlets and a plurality of manifold outlet valves.

According to an embodiment of the present application, the compressed air supply device further includes a compressed air transmission passages communicating with the compressed air storage device, and a compressed air exhaust device communicating with the compressed air transmission passages; the compressed air transmission passages includes a decompression chamber, connecting pipes and a check valve; the connecting pipes and the check valve are arranged between the compressed air storage device and the decompression chamber, between the adjacent decompression chamber, between the decompression chamber and the compressed air exhaust device, and between the decompression chamber and the cylinder type sleeve for one-way transmission of compressed air.

According to an embodiment of the present application, the compressed air exhaust device includes a compressed air artificial wind exhaust device; the compressed air artificial wind exhaust device is sequentially provided with an expansion chamber, a convergent-divergent tube and a wind-blowing pipe from top to bottom; the expansion chamber has an inner diameter larger than the pipe diameter of the connecting pipe connected thereto, the expansion chamber is provided with a gas injection regulator on an inner wall thereof, the gas injection regulator is configured to regulate the pressure and flow rate of the compressed air injected into the expansion chamber from the connecting pipe and the check valve, and the wind-blowing pipe is divided into several sub-tubes surrounding the periphery of the cyclone cylinder to deliver the air flow to the in-duct compressed air artificial wind blowing ports; wherein each of the in-duct compressed air artificial wind blowing ports includes a plurality of horizontally expanded orifices for compressed air artificial wind which eject air flows horizontally towards the leading edge of the corresponding stationary blade.

According to an embodiment of the present application, the compressed air exhaust device further includes a plurality of compressed air jet engines; each of the compressed air jet engines includes a compressed air expansion chamber and a jet engine de-Laval nozzle; the compressed air expansion chamber receives compressed air transmitted from the connecting pipe and the check valve, and generates thrust by a reaction force of high-speed air flows ejected from orifices of the jet engine de-Laval nozzle; wherein the compressed air j et engines include a left-rear jet engine, a left-front jet engine, a right-rear jet engine, and a right-front jet engine that are arranged on left and right sides of the seat frame to eject air backward and forward respectively, and several down jet engines which are arranged under the seat frame to eject air downward.

According to an embodiment of the present application, the personal flying machine using compressed air as a power source further includes a safety equipment including a compressed air safety airbag system 94 and an emergency-rescue parachute system 95; wherein the compressed air safety airbag system 94 includes sensors 96, an electronic controller unit 103 and a safety airbag 104; the sensors 96 include accelerometers configured to detect the change in speed of the personal flying machine using compressed air as a power source and impact sensors configured to detect the type, angle and severity of a collision, and the accelerometers and the impact sensors are communicatively connected to the electronic controller unit 103 to feed detected information to the electronic controller unit 103; the electronic controller unit 103 is configured to analyze and judge the information to determine whether to deploy inflation of the safety airbags 104; the safety airbag 104 includes a compressed air storage tank, an intake valve, an airbag, and a vent hole; the compressed air storage tank is configured to store compressed air, the airbag is arranged on the seat frame and connected to the compressed air storage tank through the intake valve, the vent hole is that between the airbag and the atmosphere, and the compressed air stored in the compressed air storage tank is controllably inflated into the airbag via the opened inlet valve; the emergency-rescue parachute system includes a parachute, a parachute opening rope 99, a compressed air jet engine for parachute expansion 100 and a compressed air balloon for accelerating parachute expansion 102; a canopy 105 and ropes of the parachute 106 are folded and installed in a sealed parachute bag with a Velcro, arranged on an upper end of the back board, and the upper end of the back board is provided with a hanging point 101 connected with an end of the parachute ropes passing through the sealed parachute bag; the Velcro is opened when the compressed air jet engine for parachute expansion 100 is launched; one end of the parachute opening rope 99 is connected to the parachute, and the other end of the parachute opening rope 99 is connected to the compressed air jet engine for parachute expansion 100; the compressed air jet engine for parachute expansion 100 includes a compressed air storage pipe, an intake pipe with a controllable valve, an expansion chamber and a de-Laval nozzle; when the controllable valve is opened, compressed air in the compressed air storage pipe enters the expansion chamber through the intake pipe and is ejected downward from the de-Laval nozzle to drive the compressed air jet engine for parachute expansion 100 to shoot upward and guides the parachute opening rope 99 to be lifted into the air, and the parachute opening rope 99 pulls the parachute out of the sealed parachute bag with the opened Velcro and lifts the parachute into the air; a plurality of the compressed air balloons for accelerating opening of the parachute are respectively arranged on an inner side of a bottom edge of the canopy 105, provided with balloon valves for opening parachute in a direction toward an inner side of the canopy 105; the balloon valve for opening parachute is opened when the parachute is pulled out of the sealed parachute bag and lifted into the air, and the compressed air in the compressed air balloon for accelerating parachute expansion 102 is injected into the canopy 105 to accelerate the opening of the parachute 107.

According to an embodiment of the present application, the personal flying machine using compressed air as a power source further includes a control system configured to control the operation of the safety equipment, and includes a manual driving operation device and an automatic control system; wherein the manual driving operation device includes a raising pedal, a lowering pedal, a start-accelerator pedal, a deceleration-brake pedal, a left-turn button and a right-turn button; the raising pedal and the lowering pedal are arranged on the left foot pedal bracket, the start-accelerator pedal and the deceleration-brake pedal are arranged on the right foot pedal bracket, and the left-turn button and the right-turn button are respectively arranged below front ends of the armrests on the left and right sides; the automatic control system includes an attitude balance feedback control system and an autopilot system, wherein the attitude balance feedback control system includes an attitude balance sensor, a computer center, and a compressed air jet engine for attitude control that cooperate with each other; the autopilot system includes a sensing facilities, a connection network, and an actuator; the sensing facilities includes a sensor, a global positioning system, and an inertial measurement unit and is configured to collect and process the environmental information, positioning and heading information of the personal flying machine using compressed air as a power source; the connection network includes an Internet of Things of personal flying machine to which the sensing facilities is connected; the actuator includes facilities capable of receiving and executing instructions to automatically control the altitude, speed and steering of the personal flying machine using compressed air as a power source.

An embodiment of the present application further provides an operation method of a personal flying machine using compressed air as a power source, including: inflating the compressed air supply device with compressed air; controlling the compressed air supply device to supply compressed air to the in-duct compressed air artificial wind blowing ports, so that the in-duct compressed air artificial wind blowing ports ejects airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air; driving and controlling the personal flying machine using compressed air as a power source to maintain a balanced attitude, fly to a destination and/or hover over the destination; controlling the volume and speed of artificial winds ejected by the in-duct compressed air artificial wind blowing ports to be gradually decreased, so that the lift of the stationary rotor lift device in a cyclone duct decreases gradually, and the personal flying machine using compressed air as a power source starts to descend; when the ground end of supporting leg touches the ground, the piston rod type column pushes up the piston, causing the piston to move towards a top of the inner cavity of the cylinder type sleeve and allowing the exhaust valve to be opened for landing buffer.

The beneficial effects of the present application are as follows:

In a personal flying machine using compressed air as its power source with its operation method provided by the present application:

(1) In the present application, the stationary rotor lift device in a cyclone duct using compressed air as its power source overcomes the problems and shortcomings regarding the engines of the personal flying machines in the prior art, such as:

overcoming the problems and shortcomings of energy depletion and environmental pollution faced by the engines of the personal flying machines in the prior art which have relied on the combustion of fossil fuels to produce high-temperature and high-pressure gas to do work, since the present application makes use of the stationary rotor lift device in a cyclone duct to generate the lift for energy saving and environmental protection.

The present application overcomes one of the problems and shortcomings of the engines of the personal flying machines in the prior art is that the working capacity by producing and using high-pressure gas is limited due to the accompanying high temperature of combustion gas (high-temperature resistant materials are expensive, and the materials may withstand limited pressure at high temperature), the other is that the emission of high-temperature exhaust gas losses a large amount of heat energy, resulting in low energy utilization and efficiency. While the present application using the stationary rotor lift device in a cyclone duct to generate the lift with high pressure/ultra-high pressure compressed air to do work is not affected by high temperature and the exhaust gas has no heat energy loss.

The present application therefore overcomes the potential safety hazards caused by the high temperature of the gas produced/ejected by/from the engines of the personal flying machines in the prior art. Moreover, in the present application, no cooling system also needs to be equipped, which will be beneficial to lightening the weight, simplifying the structure of the personal flying machines in the present application, and reducing its related cost.

(2) The present application overcomes the problems and shortcomings of the personal flying machines in the prior art regarding using "wings" to generate lift.

It is well known that the formula for calculating the lift may be expressed as:

$$Y = \frac{1}{2} C_y \rho v^2 S$$

where
Y=lift
$C_y$=lift coefficient (related to airfoil, angle of attack, etc.)
ρ=air density
v=air velocity (namely the speed of relative movement of air and wings, the square of which is proportional to the lift)
S=wing area.

Therefore, when the lift coefficient (related to airfoil, angle of attack, etc.), air density, and wing area are relatively fixed, the air velocity (the speed of the relative movement of air and wings) becomes the key factors to determine the wing lift. In this regard, there is a very important concept in aerodynamics: "wing being stationary while air being moving" and "air being stationary while wing being moving" are essentially the same, the real key lies in the speed of the relative movement of air and wing. When the air velocity reaches a certain value, it generates lift to overcome its own gravity.

The problems and shortcomings of the personal flying machines in the prior art in the use of "wings" to generate lift are as follows:

some of most known prior art personal flying machines are "wingless" (referred to Background Technology). Such a personal flying machine cannot get the lift corresponding to the wings to overcome its own gravity when it flies in the atmosphere, so that the time of its staying/flying in the air is extremely short.

Although some of the personal flying machines in the prior art have wings, but in the traditional way of "air being stationary while wing being moving" to generate a speed of relative movement of air and wings so as to generate lift, so as described in the Background, or a pilot carrying the wings on his back needs to run on a runway or jump from high altitude, or the internal combustion engines to drive the rotor/propeller blades to rotate at a high speed doing more transmission work resulting in large energy consumption and environment pollution, etc.

In the present application, the stationary rotor lift device in a cyclone duct uses the high-speed movement of compressed air artificial wind relative to the stationary blades with a certain airfoil and angle of attack to generate lift. This "wing being stationary while air being moving" mode generates a speed of relative movement of air and wings so as to generate lift, without by a pilot running on a runway or jumping from a high altitude, also overcoming the problems that the rotor/propeller blades are driven by the internal combustion engine to rotate at a high speed accompanied by more transmission work, high energy consumption, environmental pollution, etc. In the cyclone cylinder, moreover, the air velocity (v) of cyclone flow formed by compressed air artificial wind is very high, and the air density (ρ) of the compressed air is also rather high, so that the lift generated here is large and controllable. Besides, the lift-increasing device is also provided, such as said additional stationary rotor and in-duct fixed wings in the cyclone cylinder such that the high-speed cyclone airflow is further utilized to increase the lift, wherein for "cyclone", there are some unexpected beneficial effects, such as ① The low air pressure (lower than the atmospheric pressure of the external environment) due to the high wind speed of air column rotating at a high speed inside cyclone cylinder is also advantageous to increase the lift of cyclone cylinder; ② while the diameter of cyclone in the gradually widening lower opening increases gradually, due to conservation of angular momentum, the wind speed of the cyclone gradually decreases, and its air pressure rises in some extent, so that the gradually widening lower opening has a certain lifting effect on cyclone cylinder; ③ since the cyclone in gradually widening lower opening still has a relatively high wind speed, with an air pressure significantly lower than outside atmospheric pressure, so that the gradually widening lower opening receives lift force from the atmosphere to a certain extent; ④ the cyclone in gradually widening lower opening continues to descend until it discharges downward from the gradually widening lower opening, also giving the gradually widening lower opening a certain lift force as a reaction force against it.

BRIEF DESCRIPTION OF THE DRAWINGS

In order to explain the technical solutions of the embodiments of the present application more clearly, a brief introduction to the drawings needed in the description of the embodiments will be given below. Obviously, the drawings in the following are related to the embodiments of the present application, but other drawings based on these drawings can also be obtained by a person of ordinary skill in the art without creative work.

REFERENCE NUMERALS

Figure 1:
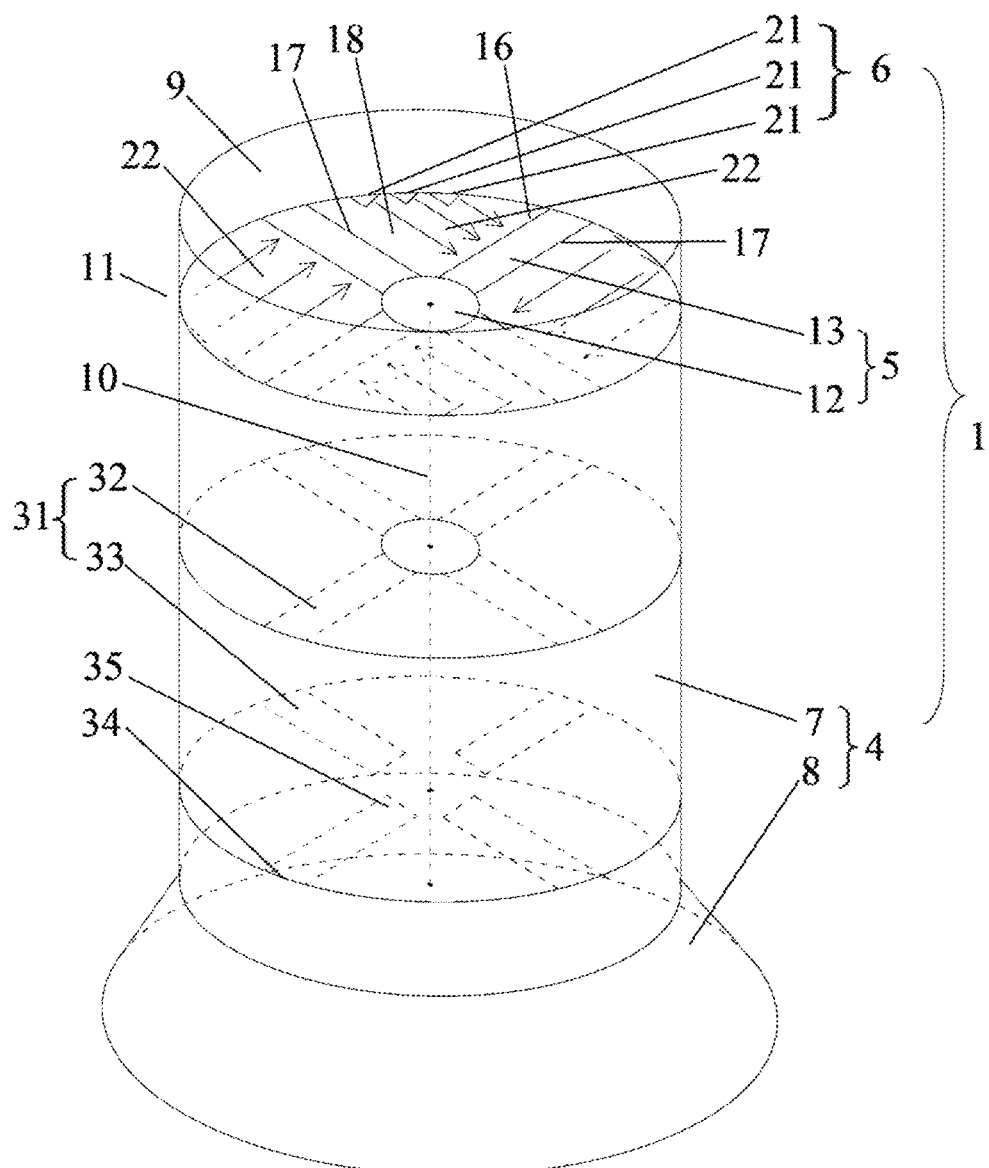
FIG. 1 is a three-dimensional schematic view of a stationary rotor lift device in a cyclone duct according to an embodiment of the present application.

Reference numbers: 1: stationary rotor lift device in a cyclone duct; 2: seat frame; 3: compressed air supply device;

4: cyclone duct; 5: in-duct stationary rotor; 6: in-duct compressed air artificial wind blowing port; 7: cyclone cylinder; 8: gradually widening lower opening; 9: cyclone cylinder inner wall; 10: axis; 11: working horizontal section; 12: stationary propeller hub; 13: stationary blade; 14: airfoil; 15: angle of attack; 16: leading edge; 17: trailing edge; 18: fan-shaped space; 19: clockwise order; 20: counterclockwise order; 21: orifice for compressed air artificial wind; 22: airflow; 23: high-speed airflow direction; 24: stationary blade leading-trailing line; 25: upper surface; 26: lower surface; 27: airflow downward slope; 28: lift; 29: clockwise in-duct cyclone stationary rotor lift arrangement; 30: counterclockwise in-duct cyclone stationary rotor lift arrangement; 31: lift-increasing device; 32: additional stationary rotor; 33: in-duct fixed wing; 34: wing root; 35: wing end; 36: back board; 37: seat board; 38: armrest; 39: supporting leg; 40: buckle mechanism; 41: rotating connection; 42: front supporting leg; 43: rear left supporting leg; 44: rear right support leg; 45: piston rod type column; 46: cylinder type sleeve; 47: piston; 48: ground end of supporting leg; 49: ground; 50: movable joint; 51: inflation valve; 52: exhaust valve; 53: end port; 54: left foot pedal bracket; 55: right foot pedal bracket; 56: compressed air storage device; 57: compressed-air transmission passage; 58: compressed air exhaust device; 59: air storage pipe; 60: manifold; 61: pipe inlet; 62: pipe inlet valve; 63: pipe outlet; 64: pipe outlet valve; 65: inlet manifold; 66: outlet manifold; 67: manifold air inlet; 68: manifold inlet valve; 69: manifold air outlets; 70: manifold outlet valve; 71: decompression chamber; 72: connecting pipe; 73: check valve; 74: compressed-air artificial wind exhaust device; 75: compressed-air jet engine; 76: expansion chamber; 77: convergent-divergent tube; 78: wind-blowing pipe; 79: compressed-air expansion chamber; 80: jet engine de-Laval nozzle; 81: left-rear jet engine; 82: left-front jet engine; 83: right-rear jet engine; 84: right-front jet engine; 85: sealed parachute bag; 86: raising pedal; 87: lowering pedal; 88: start-accelerator pedal; 89: decelerator-brake pedal; 90: left turn button; 91: right turn button; 92: down jet engine; 93: connecting structure; 94: compressed air safety airbag system; 95: emergency-rescue parachute system, 96: sensor, 97: accelerometer, 98: impact sensor, 99: parachute opening rope, 100: compressed air jet engine for parachute expansion 101: hanging point, 102: compressed air balloon for accelerating parachute expansion, 103: electronic controller unit, 104: safety airbag, 105: canopy, 106: ropes of the parachute, 107: parachute.

DETAILED DESCRIPTION

Hereinafter, in order to make the objectives, technical solutions, and advantages of the embodiments of the present application clearer, the technical solutions in the embodiments of the present application will be described clearly and completely in conjunction with the drawings in the embodiments of the present application. Obviously, this description does not comprise all of the embodiments of the present application, but a part of them. Based on the embodiments of the present invention, all other embodiments obtained by those of ordinary skill in the art without creative work shall fall within the protection scope of the present invention.

In the description of the present application, it should be noted that the terms "installation" and "connection" should be interpreted in a broad sense unless otherwise clearly specified and defined. For example, a connection can be fixedly connected or detachable, or integrated, can be either a mechanical or an electrical connection, can be either directly connected or indirectly connected through an intermediary, or an internal communication between two components. For a person of ordinary skill in the art, the specific meanings of the above-mentioned terms in the present application can be understood under specific circumstances.

In addition, in the description of the present application, "plurality" means two or more, while "several" means one or more.

Referring to FIGS. 1-6, the embodiments of a personal flying machine using compressed air as power source, with its operation method according to the present application are described. It should be understood that the followings are only some exemplary embodiments of this present invention, and do not constitute any particular limitation to the present application.

As shown in FIGS. 1-6, a personal flying machine using compressed air as power source according to the embodiments of the present application includes a stationary rotor lift device in a cyclone duct 1, seat frame 2, compressed air supply device 3, safety equipment and control system; wherein the stationary rotor lift device in a cyclone duct 1 and compressed air supply device 3 are installed on seat frame 2.

Figure 2:
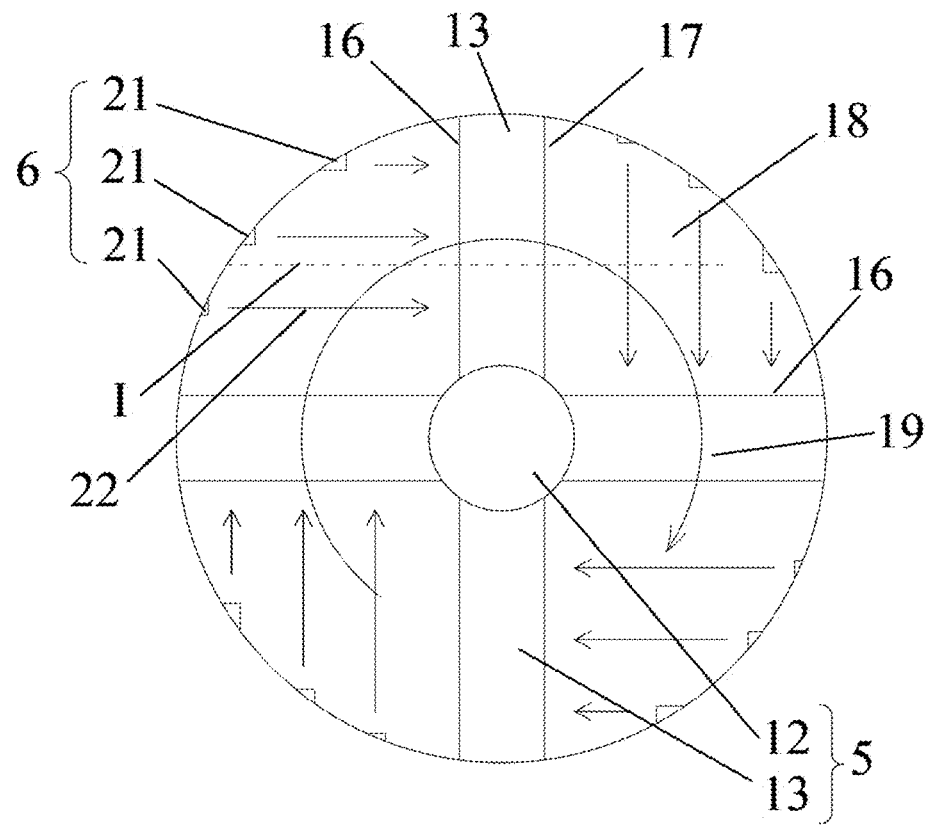
FIG. 2 is a schematic top view of a cyclone duct working horizontal section according to an embodiment of the present application.

As shown in FIGS. 1 and 2, the stationary rotor lift device in a cyclone duct 1 includes a cyclone duct 4, an in-duct stationary rotor 5 and in-duct compressed air artificial wind blowing ports 6.

Specifically, the cyclone duct 4 is a gas channel including a cyclone cylinder 7 and a gradually widening lower opening 8 and arranged vertically on each of both sides of seat frame 2. The cyclone cylinder inner wall 9 is a cylindrical curved surface, which is smoothly formed by rotating in a circle a line segment on cyclone cylinder inner wall 9 in a certain parallel distance of the cylinder radius from cyclone cylinder axis 10. The upper part of cyclone cylinder 7 is open to communicate with the atmosphere, while the lower part of cyclone cylinder 7 continues with gradually widening lower opening 8, which is formed with a symmetrical extension of the lower end of cyclone cylinder 7 in a distance. The cross section of each segment of gradually widening lower opening 8 is circular, and the diameter of the circle shown in each cross section increases gradually from top to bottom. A horizontal section located in the upper-middle part of the cyclone cylinder 7 is called as the working horizontal section 11, on which in-duct stationary rotor 5 and in-duct compressed air artificial wind blowing ports 6 are distributed.

Figure 3:
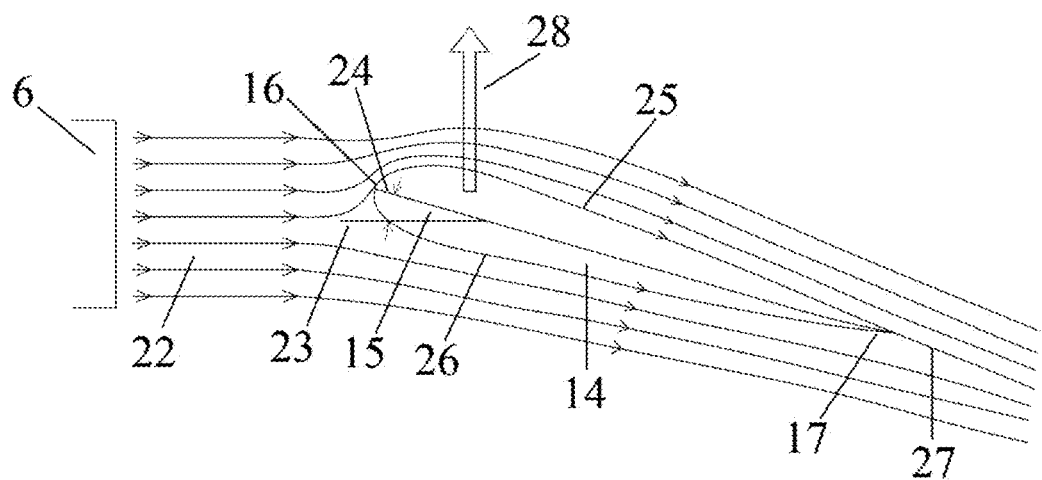
FIG. 3 is an enlarged front view of I-section of FIG. 2 showing lift generation according to an embodiment of the present application.

As shown in FIGS. 1-3, in-duct stationary rotor 5 includes a stationary propeller hub 12 and a plurality of stationary blades 13 fixedly connected radially around the stationary propeller hub 12. The main difference between stationary propeller hub 12 and stationary blades 13 of in-duct stationary rotor 5 and those of a real rotor is that the stationary propeller hub 12 and stationary blades 13 are "stationary" and do not rotate, and horizontally stationed in cyclone cylinder 7. The center of stationary propeller hub 12 is located on cyclone cylinder axis 10 and is not connected to any engine shaft. The stationary propeller hub 12 itself is stationary and does not drive stationary blades 13 fixedly connected around it to rotate. The outer peripheral end of stationary blades 13 is fixedly connected to cyclone cylinder inner wall 9. Each of stationary blades 13 is shaped like a wing with airfoil 14, and angle of attack 15, leading edge 16 and trailing edge 17, and its trailing edge 17 is adjacent to leading edge 16 of another of stationary blades 13 with a fan-shaped space 18 so that a plurality of stationary blades 13 radially connected around stationary propeller hub 12 are arranged in sequence from leading edge 16 to trailing edge 17 and in a clockwise order 19 or counterclockwise order 20 (see FIG. 4), respectively called as clockwise or counterclockwise ordering stationary blades. The in-duct stationary rotor 5 with a clockwise or counterclockwise order of stationary blades is called as clockwise or counterclockwise in-duct stationary rotor, while the cyclone cylinder with a clockwise or counterclockwise in-duct stationary rotor is called as a clockwise or counterclockwise cyclone cylinder.

As shown in FIGS. 1-3, there are plurality of in-duct compressed air artificial wind blowing ports 6, each of which corresponds to one of stationary blades 13 in the working horizontal section 11, is arranged on cyclone cylinder inner wall 9, and includes a group of several orifices for compressed air artificial wind 21 horizontally expanded. Each group of the orifices for compressed air artificial wind 21 is configured to eject high-speed airflow 22 horizontally toward leading edge 16 of a corresponding one of stationary blades 13. The angle between the high-speed airflow direction 23 and the stationary blade leading-trailing line 24 is equivalent to angle of attack 15, that is, the angle between airplane wing chord and the direction of its relative airflow, meaning that the relative movement between high-speed airflow 22 and stationary blades 13 is equivalent to that between the high-speed rotating blades of a rotorcraft and the stationary air. In this way, high-speed airflow 22 ejected from in-duct compressed air artificial wind blowing ports 6 increases the pressure difference between the stationary blade upper surface 25 and the lower surface 26 of a certain airfoil 14 (the upper surface has high airflow velocity and low pressure). The high-speed airflow 22 ejected from in-duct compressed air artificial wind blowing ports 6 also attacks the stationary blade lower surface 26 at a certain angle of attack 15, and flows at a high velocity closely along the protruding stationary blade upper surface 25 until living the trailing edge 17 of the stationary blade in an airflow downward slope 27. Therefore, according to Bernoulli's principle, Newton's Third Law and Coanda Effect, such a high-speed airflow 22 ejected from in-duct compressed air artificial wind blowing ports 6 has the effect of increasing the lift 28 of stationary blades 13. Wherein, the in-duct compressed air artificial wind blowing ports 6 blows stationary blades 13 in a clockwise or counterclockwise order are called clockwise or counterclockwise artificial wind blowing ports, respectively.

After high-speed airflow 22 of the artificial wind ejected from clockwise or counterclockwise artificial wind blowing ports blows the corresponding clockwise or counterclockwise one of stationary blade 13 on a side of stationary propeller hub 12, the cylindrical curved surface of cyclone cylinder inner wall 9 adjacent to the trailing edge of propel blades guides the airflow to rotate clockwise or counterclockwise along the cylindrical curved surface of cyclone cylinder inner wall 9. The cyclone rotating clockwise or counterclockwise along the cylindrical surface of cyclone cylinder inner wall 9 around cyclone cylinder axis 10 maintains a certain angular momentum, and is continuously supplemented and superimposed by high-speed airflow 22 of the artificial wind ejected from a plurality of clockwise or counterclockwise artificial wind blowing ports in the same cyclone cylinder 7 as well as the cyclone rotating clockwise or counterclockwise along the cylindrical curved surface of cyclone cylinder inner wall 9 around cyclone cylinder axis 10, forming an air column rotating clockwise or counterclockwise at high speed in cyclone cylinder. Herein, part of high-speed rotating airflow has a relative movement at high speed in a plurality of different extents toward stationary blade 13 with a certain airfoil 14 and angle of attack 15, which is advantageous for the compressed air artificial wind to improve the lift utilization rate. The low air pressure (lower than the atmospheric pressure of the external environment) due to the high wind speed of air column rotating in cyclone cylinder 7 is also advantageous to increase the lift of cyclone cylinder 7.

The aerodynamic effects in the relative movement of air flows and stationary blades 13 tilts the airflow downward slope 27 flowing along stationary blade 13, wherein the air flows involve the artificial wind ejected from in-duct compressed air artificial wind blowing ports 6 and the high-speed airflow of the cyclone in the high-speed rotating air column in cyclone cylinder 7 while the stationary blades 13 have certain airfoil 14 and angle of attack 15. This downward velocity component causes the cyclone in clockwise or counterclockwise high-speed rotating air column to have a certain downward trend in the rotation, forming a high-speed clockwise or counterclockwise spiral descending cyclone in high-speed rotating air column in the cyclone cylinder until the spiral descending cyclone rotates downward from the cyclone cylinder 7 into the gradually widening lower opening 8.

After rotating downward from the cyclone cylinder 7 into the gradually widening lower opening 8, the spiral descending cyclone continues to rotate downward, where the diameter of clockwise or counterclockwise rotating cyclone increases gradually as the diameter of the gradually widening lower opening 8 increases. Due to conservation of angular momentum, the wind speed of the cyclone gradually decreases with the increase in its diameter in the gradually widening lower opening 8, while its air pressure rises in some extent, higher than that in the upper part of the cyclone cylinder 7, so that the gradually widening lower opening 8 has a certain lifting effect on cyclone cylinder 7.

Since the cyclone in gradually widening lower opening 8 still has a relatively high wind speed, an air pressure in gradually widening lower opening 8 is significantly lower than outside atmospheric pressure, so that the gradually widening lower opening 8 receives lift force from the atmosphere to a certain extent. The spiral descending cyclone in gradually widening lower opening 8 continues to descend in clockwise or counterclockwise rotation until it discharges downward in a clockwise or counterclockwise manner from the gradually widening lower opening 8. The airflow discharged downward in a clockwise or counterclockwise manner from the gradually widening lower opening 8 also endows the gradually widening lower opening 8 a certain lift force as a reaction force against it.

Figure 4:
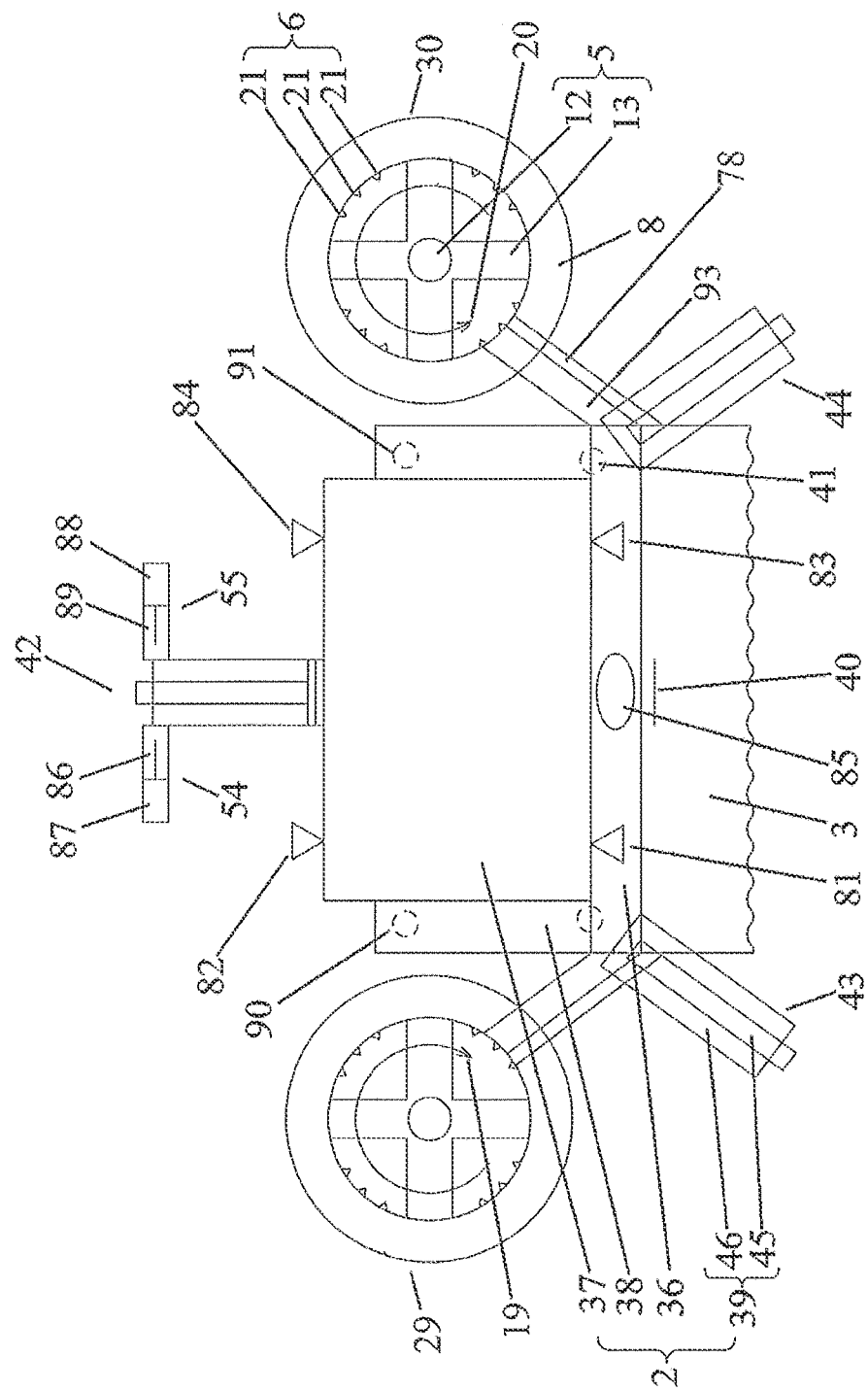
FIG. 4 is a schematic top view of a personal flying machine using compressed air as power source according to an embodiment of the present application.

In an embodiment, an in-duct cyclone stationary rotor lift arrangement, with the stationary blades arranged in a clockwise direction in cyclone duct, the clockwise artificial wind blowing ports generating a clockwise high-speed rotating air column, a clockwise high-speed spiral descending cyclone, and a clockwise cyclone downward discharge, is called clockwise in-duct cyclone stationary rotor lift arrangement 29 (see FIG. 4). An in-duct cyclone stationary rotor lift arrangement, with the stationary blades arranged in a counterclockwise direction in cyclone duct, the counterclockwise artificial wind blowing ports generating a counterclockwise high-speed rotating air column, a counterclockwise high-speed spiral descending cyclone, and a counterclockwise cyclone downward discharge, is called counterclockwise in-duct cyclone stationary rotor lift arrangement 30 (see FIG. 4). As shown in FIG. 4, clockwise in-duct cyclone stationary rotor lift arrangement 29 and counterclockwise in-duct cyclone stationary rotor lift arrangement 30 are symmetrically fixed on the left and right sides of seat frame 2, respectively, through a connecting structure 93 in a torque balance. The compressed air supply device 3, safety equipment and control system are also installed on seat frame 2, respectively.

Figure 5:
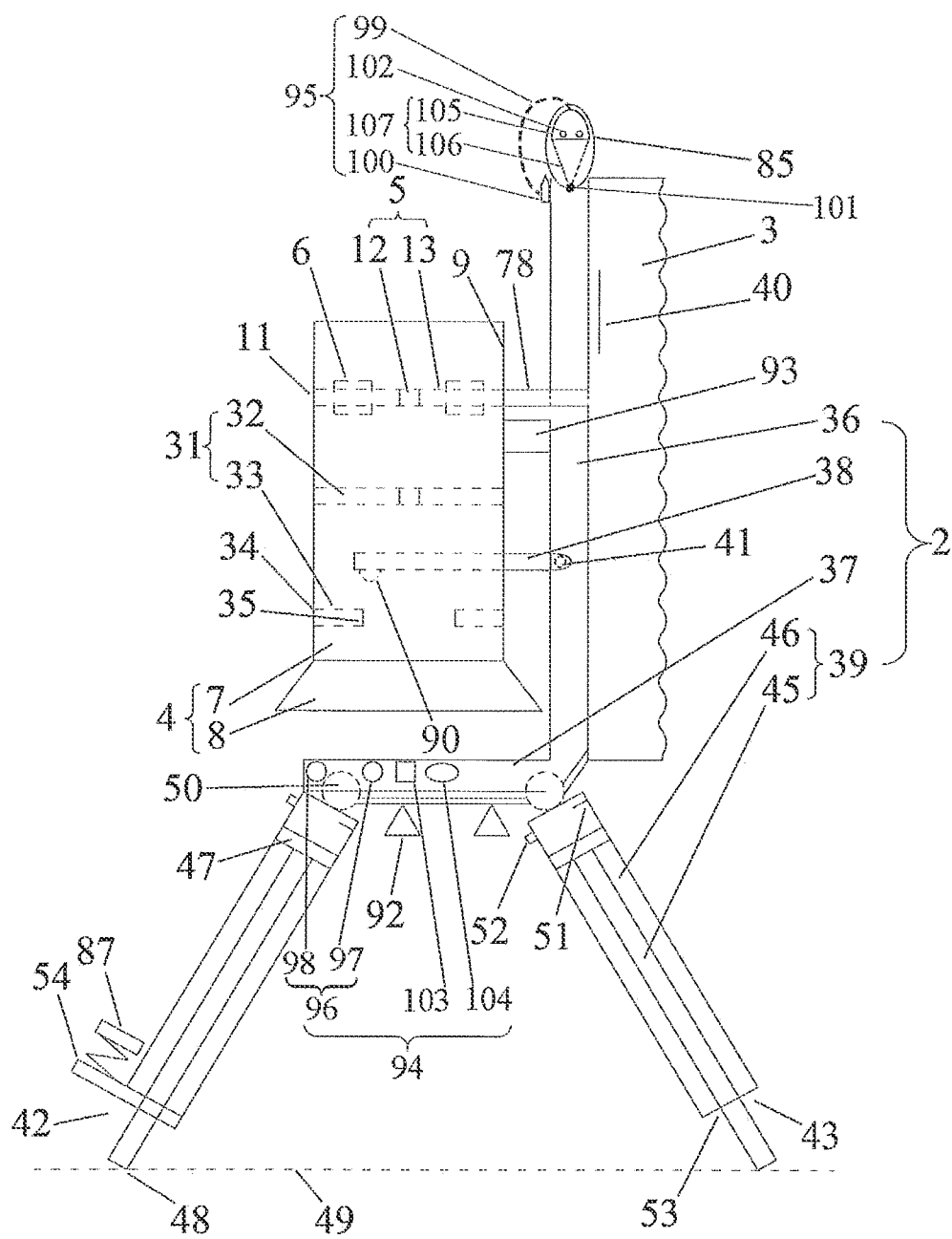
FIG. 5 is a schematic side view of a personal flying machine using compressed air as power source according to an embodiment of the present application.

As shown in FIGS. 1, 3 and 5, beneath the in-duct stationary rotor 5 in cyclone cylinder 7, a lift-increasing device 31 is provided, including an additional stationary rotor 32 and in-duct fixed wings 33.

Specifically, there may be one additional stationary rotor 32 or more, fixedly arranged on several horizontal sections beneath in-duct stationary rotor 5 in cyclone cylinder 7. The additional stationary rotors 32 have the same morphological structure and fixing method as those of in-duct stationary rotor 5. More specifically, one additional stationary rotor or more in a clockwise arrangement are present in a clockwise cyclone cylinder, and one additional stationary rotor or more in a counterclockwise arrangement are present in a counterclockwise cyclone cylinder, and these additional stationary rotors have airfoil 14 and angle of attack 15 of stationary blades adapted to the flowing direction of the cyclone in cyclone cylinder 7.

One or more layers of in-duct fixed wings 33 may be provided in each cyclone cylinder 7, wherein each of the in-duct fixed wings 33 includes a plurality of wings symmetrically distributed on a horizontal segment. Wing root 34 of each wing is fixedly connected to cyclone cylinder inner wall 9, and its wing end 35 extends to the center of cyclone cylinder 7 but not to exceed the cyclone cylinder axis 10. The airfoil 14, angle of attack 15, leading edge 16 and trailing edge 17 are adapted to the flowing direction of the cyclone in cyclone cylinder 7.

As shown in FIGS. 4 and 5, the seat frame 2 is a frame structure made of high-strength and light-weight materials, and includes a back board 36, a seat board 37, armrests 38 and supporting legs 39.

Specifically, back board 36 is a chair-back-shaped structure, with a buckle mechanism 40 provided on the back of the back board 36 for installing and fixing the compressed air supply device 3. A pair of shoulder straps and an abdominal strap are arranged in front of the back board 36, used to tie the pilot to the back board 36 from the shoulders and abdomen of a human body, and the lower part of the back board 36 is connected to the seat board 37.

The seat board 37 is a plate structure with a sitting surface, and a pair of hip-leg straps are provided on the seat board 37 to tie the pilot's hips and legs to it from the left and right groins of a human body, respectively.

The armrests 38 are left and right armrests having similar shape and position to the armrests of an armchair. The rear ends of the two armrests 38 and the two sides of the back board 36 or the seat board 37 form a rotating connection 41, and the front ends of the two armrests 38 may move up and down, left and right, under control, using the rear end rotating connection 41 as an axis.

There may be several supporting legs 39, usually three extending outward from the lower part of the back board 36 or the seat board 37, respectively, and being referred to as the front supporting leg 42, rear left supporting leg 43, and the rear right support leg 44 according to their locations. Each of the supporting legs 39 includes a piston rod type column 45 and a cylinder type sleeve 46 sleeved outside it.

Specifically, the upper end of the piston rod type column 45 is a piston 47, able to slide up and down in the cylinder type sleeve 46, while the lower end thereof is the ground end of supporting leg 48, which of all support legs touches the earth with even distribution on the horizontal ground 49. The upper end of the inner wall of cylinder type sleeve 46 is connected to the lower part of the back board 36 or the seat board 37 through a movable joint 50. The wall of inner cavity of cylinder type sleeve 46 is smooth and in sealing contact with piston 47 able to slide up and down in its inner cavity. The upper end of inner cavity of cylinder type sleeve 46 is provided with an inflation valve 51 and an exhaust valve 52, while its lower end is provided with an end port 53. The diameter of end port 53 is adapted to the diameter of piston rod type column 45 to make it move smoothly up and down in cylinder type sleeve 46 along with piston 47, to restrain piston 47 from sliding down.

Furthermore, the left and right sides of the lower end of cylinder type sleeve 46 of front supporting leg 42 are provided with short plates perpendicular to the sleeve, respectively called the left foot pedal bracket 54 and the right foot pedal bracket 55. The overall length of supporting legs 39 is adjustable by adjusting the extent of overlapping of piston rod type column 45 and cylinder type sleeve 46, meaning that the more or less the piston rod type column 45 and cylinder type sleeve 46 are overlapped, the shorter or longer the total length of the supporting legs 39.

Specifically, when the total length of a supporting leg is shortest as piston rod type column 45 and cylinder type sleeve 46 are overlapped to a maximum extent, it is the basic landing length of the supporting leg. If the personal flying machine is supported and stopped on the ground 49 at its basic landing length, the height from seat board 37 to ground 49 is equivalent to the length of a human calf. When piston rod type column 45 and cylinder type sleeve 46 are overlapped to a minimum extent, total length of supporting legs is longest and reaches its longest limit. When the personal flying machine is supported and stopped on the ground 49 with the longest length of its supporting legs, the height from seat board 37 to ground 49 is greater than the length of entire lower limbs of a human body. Since the movable joint 50 at the upper end of the cylinder wall of the cylinder type sleeve 46 can adapt to a certain degree of change in the angle of intersection between the supporting legs 39 and the plane where the seat board 37 is located, so that when the personal flying machine stops on the ground 49, the support legs 39 may change from its basic landing length to that of its longest supporting legs, or from the length of its longest supporting legs to its basic landing length. When the human hip is sitting on the seat board 37, the knee joints can be slightly bent, and the two feet can be easily placed on left foot pedal bracket 54 and right foot pedal bracket 55. When the personal flying machine stationing at the basic landing length and it supporting legs is stopped on the ground 49 to start its take-off procedure, the exhaust valve 52 is closed under control, and the compressed air may enter the upper part of inner cavity of cylinder type sleeve 46 through opened inflation valve 51, so that the air pressure in the upper part of inner cavity of cylinder type sleeve 46 over piston 47 rises sharply to reach a certain level, the piston 47 is pushed down quickly to make piston rod type column 45 extend downward from end port 53 to the space beyond the lower end of cylinder type sleeve 46. During this process, the overlapping of piston rod type column 45 and cylinder type sleeve 46 is reduced while the total length of supporting legs 39 is increased until the longest length of supporting legs is reached. Due to the interaction of action and reaction between the ground end of supporting legs 48 supported on the ground and ground 49, when the total length of supporting legs 39 increases, the cylinder type sleeve 46 and the main part of the personal flying machine above are pushed up to ascend rapidly, playing a role of "take-off assistance"

to assist the lift generated by clockwise in-duct cyclone stationary rotor lift arrangement 29 and counterclockwise in-duct cyclone stationary rotor lift arrangement 30, thus enabling the personal flying machine to take off and ascend with the longest supporting legs, which has the effect of "takeoff assistance" to allow the personal flying machine to take off with the longest support leg assisting lifts generated by the clockwise in-duct cyclone stationary rotor lift arrangement 29 and the counterclockwise in-duct cyclone stationary rotor lift arrangement 30. Conversely, when the personal flying machine with the longest supporting legs descends from the sky and the ground end of supporting leg 48 of the longest supporting legs touches the earth suddenly, the ground 49 directly prevents the piston rod type column 45 from continuing to move downward. However, the downward movement of the main body of the personal flying machine above the cylinder type sleeve 46 is not directly blocked by the ground 49. The relative movement between cylinder type sleeve 46 and piston rod type column 45 is opposite to that in the direction of the aforementioned "take-off assistance", that is, the downward movement of cylinder type sleeve 46 makes the part of piston rod type column 45 beyond end port 53 retracted into the inner cavity of cylinder type sleeve 46 through end port 53, so that the overlapping of piston rod type column 45 and cylinder type sleeve 46 increases again and the total length of supporting legs 39 decreases. In the process that the total length of supporting legs 39 is decreased to the basic landing length, the inner cavity of cylinder type sleeve 46 over piston 47 keeps shrinking to make the air pressure continue to increase. At the same time, exhaust valve 52 is opened so that the pressure in the inner cavity of cylinder type sleeve 46 will not suddenly become too high, but to form a buffer resistance to the downward movement of cylinder type sleeve 46 and the main body of the personal flying machine above. The descent speed of the touchdown is somewhat buffered, which is advantageous for the personal flying machine to reduce shock on landing. The above-mentioned increase in relative movement of overlapping of cylinder type sleeve 46 and piston rod type column 45 is referred to herein as "landing buffer".

Figure 6:
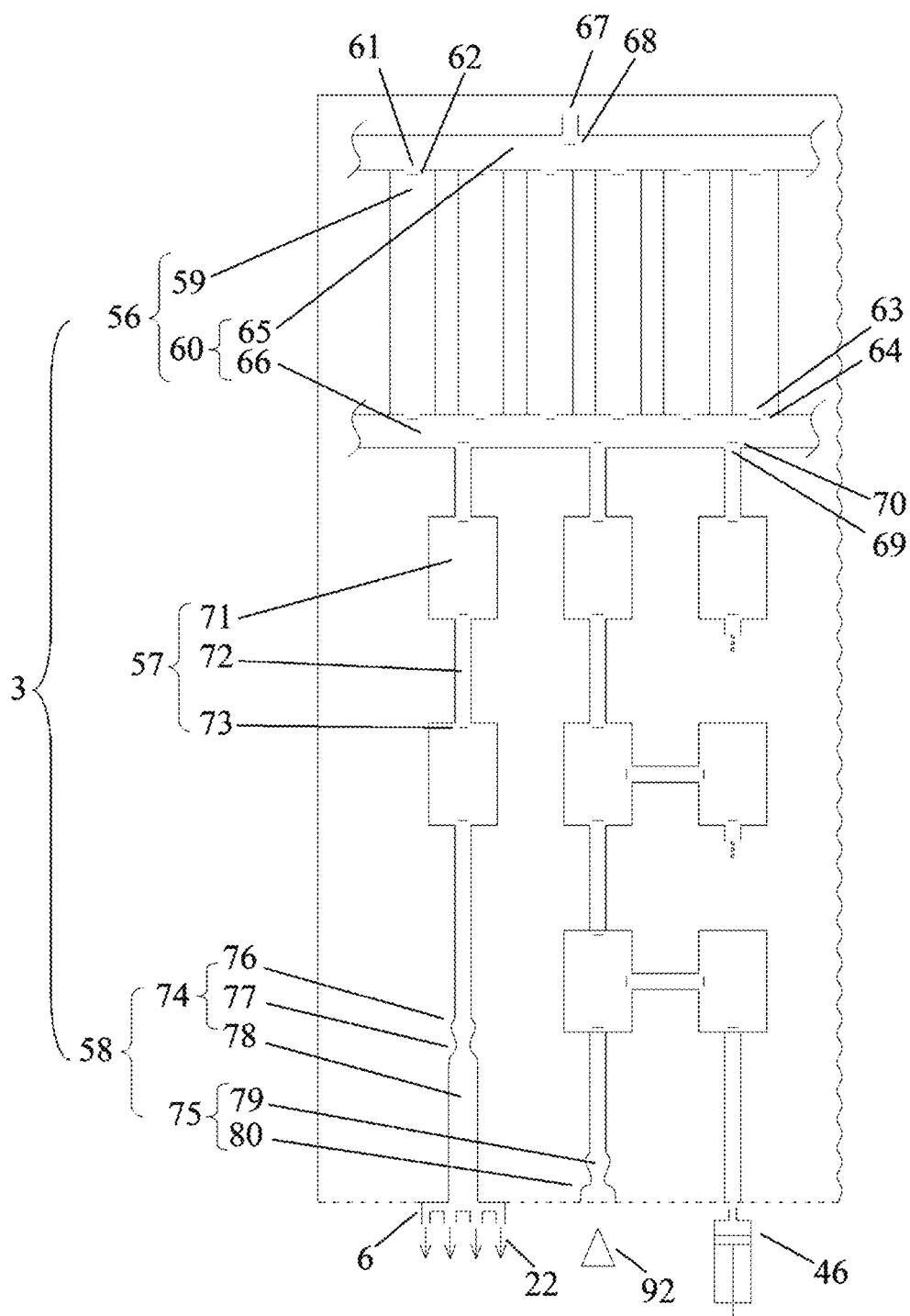
FIG. 6 is a schematic diagram of a compressed air supply device according to an embodiment of the present application.

As shown in FIG. 6 while referring to FIGS. 4 and 5, the compressed air supply device 3 may include compressed air storage device 56, compressed air transmission passages 57 and compressed air exhaust device 58.

Specifically, compressed air storage device 56 has a tubular structure, made of a light-weight and high-pressure resistant material, and is configured to store high-pressure/ultra-high-pressure compressed air. The air storage includes a plurality of air storage pipes 59 and manifolds 60 located at both ends of the air storage pipes 59.

Wherein, one end of each of air storage pipes 59 is provided with a pipe inlet 61 and a pipe inlet valve 62, while another end is provided with a pipe outlet 63 and a pipe outlet valve 64. The manifold communicating with the inlet ends of plurality of air storage pipes 59 is referred to as the inlet manifold 65, while the manifold communicating with the outlet ends of plurality of air storage pipes 59 is referred to as the outlet manifold 66. The inlet manifold 65 is provided with a manifold air inlet 67 and a manifold inlet valve 68, which are the air inlet and the air inlet valve of the compressed air storage device 56. The outlet manifold 66 is provided with manifold air outlets 69 and a manifold outlet valve 70, which are the air outlet and the air outlet valve of the compressed air storage device 56.

When the manifold outlet valve 70 is closed, the manifold inlet valve 68 is opened, and all of the valves on air storage pipes 59 are opened, the compressed air storage device 56 may be pressurized and inflated through the manifold air inlet 67, wherein, "a mechanism to produce, store and provide compressed air" disclosed in the inventor's patent "A System Economically Using Compressed Air as Automobile Power Source and Method Thereof" (Patent No. ZL 201510289802.3) may be used. Otherwise, "Compressed Air Production/Supply Device" disclosed in the inventor's another patent, "System of Using Compressed Air as a Force Source and Method Thereof; Airplane" (Patent No. ZL 201610125197.0) may be used to pressurize and inflate high-pressure/ultra-high pressure compressed air into the compressed air storage device 56. When the manifold inlet valve 68 is closed, the manifold outlet valve 70 is opened, and all of the valves on air storage pipes 59 are closed, and only when a pipe outlet valve 64 of air storage pipes 59 necessary for outputting compressed air is opened, the compressed air in the air storage pipe may be output through the pipe outlet 63 from compressed air storage device 56.

The compressed air transmission passage 57 is a passage through which the high pressure/ultra-high pressure compressed air in compressed air storage device 56 is transmitted to the compressed air exhaust device 58, and includes a decompression chambers 71, connecting pipes 72 and a check valve 73.

Specifically, there can be one decompression chamber 71 or more. When there are more, several decompression chambers 71 are connected in series to form one or several strings in the order of decreasing pressure, wherein, several decompression chambers 71 with the same design pressure may be mutually connected in parallel. The pressure in a decompression chamber 71 is lower than that in compressed air storage device 56 or in the previous decompression chamber 71 according to the design specification. The connecting pipes 72 and check valve 73 are arranged between compressed air storage device 56 and decompression chamber 71, between two decompression chambers 71, between decompression chamber 71 and compressed air exhaust device 58, and between decompression chamber 71 and cylinder type sleeve 46 or other air-using equipment for unidirectional transmission of compressed air.

The compressed air exhaust device 58 is configured to discharge compressed air having a certain design pressure transmitted from compressed air transmission passage 57 and includes compressed air artificial wind exhaust devices 74 and a compressed air jet engine 75.

In an embodiment, there are two compressed air artificial wind exhaust devices 74, respectively erected on the left and right sides of seat frame 2. Each of compressed air artificial wind exhaust devices 74 is sequentially arranged with expansion chamber 76, convergent-divergent tube 77 and wind-blowing pipe 78 from top to bottom.

Specifically, the expansion chamber 76 has an inner diameter larger than that of the connecting pipe 72 connected thereto. The inner wall of expansion chamber 76 is provided with a gas injection regulator configured to regulate the pressure and flow rate of the compressed air injected from the connecting pipe 72 and check valve 73 into expansion chamber 76. When discharged into the convergent-divergent tube 77 under a certain pressure, the compressed air entering the expansion chamber 76 gives its wall a certain upward reaction force. The convergent-divergent tube 77 has a function of "flowrate amplifier" to make the airflow flowing through it to be quickly discharged into the wind-blowing pipe 78, which is divided into several sub-tubes surrounding the periphery of cyclone cylinder 7, respectively to blow the artificial wind to the in-duct compressed air artificial wind blowing ports 6 distributed at working horizontal section 11 on cyclone cylinder inner wall 9. At the in-duct compressed air artificial wind blowing ports 6 in each duct, a group of the horizontally oriented orifices for compressed air artificial wind 21 eject high-speed airflow 22 toward leading edge 16 of a corresponding one of stationary blades 13.

The compressed air jet engine 75 is a jet engine using compressed air as its jet working medium. There are a plurality of the engines in total, and each of them includes a compressed air expansion chamber 79 and a jet engine de-Laval nozzle 80.

During usage, the compressed air expansion chamber 79 receives compressed air having a certain pressure transmitted from connecting pipe 72 and check valve 73, and generates thrust through the reaction force of high-speed airflow ejected from the jet engine de-Laval nozzle 80 of a jet engine. Since the temperature of the airflow ejected from compressed air jet engine 75 is much lower than that of the hot gas ejected from a traditional technology jet engine, no ablation damage is caused to the personal flying machine, its surrounding environment, and personnel, so that the compressed air jet engine 75 may be installed almost on any demanding location around the seat frame 2, only it is necessary to communicate a connecting pipe 72 with a check valve 73 configured to transmit compressed air under a certain pressure to that location.

The thrust generated by one compressed air jet engine 75 installed around seat frame 2 when being started individually, and the resultant force generated when being started in combination, push the personal flying machine in the target direction. For example, they are four jet engines arranged on the left and right sides of seat frame 2 to move backward and forward, respectively, refereed as the left-rear jet engine 81, left-front jet engine 82, right-rear jet engine 83, and right-front jet engine 84.

Specifically, when the left-rear jet engine 81 and right-rear jet engine 83 are turned on while left-front jet engine 82 and right-front jet engine 84 are turned off, a resultant force is generated to push the personal flying machine forward (accelerating forward flight). Then when left-rear jet engine 81 and right-rear jet engine 83 are turned off while left-front jet engine 82 and right-front jet engine 84 are turned on, a resultant force is generated to push the personal flying machine backward (buffer decelerating backward flight). When the left-rear jet engine 81 and right-front jet engine 84 are turned on while left-front jet engine 82 and right-rear jet engine 83 are turned off, a resultant force is generated to rotate the personal flying machine clockwise. When right-rear jet engine 83 and left-front jet engine 82 are turned on while right-front jet engine 84 and left-rear jet engine 81 are turned off, a resultant force is generated to rotate the personal flying machine counterclockwise. When left-rear jet engine 81 is turned on while all other three are turned off, a thrust is generated to move the personal flying machine forward and right. When right-rear jet engine 83 is turned on while all other three are turned off, a thrust is generated to move the personal flying machine forward and left.

A plurality of compressed air down jet engines 92 respectively arranged beneath seat frame 2 to eject air downward, when working individually or in cooperation, generate corresponding partial or coordinated upward thrust or combined force on the personal flying machine to improve take-off lift, buffer landing speed, or adjust the balance of seat frame 2. The compressed air jet engine 75 provides the required thrust and torque for attitude control, heading maintenance and course change of the personal flying machine.

Furthermore, the safety equipment according to the present embodiment includes a compressed air safety airbag system 94 and an emergency-rescue parachute system 95.

Specifically, the compressed air safety airbag system 94 includes sensors 96, electronic controller units 103 and safety airbags 104.

Among them, sensors 96 include accelerometers 97 and impact sensors 98. Accelerometers 97 are configured to detect the speed changes of the personal flying machine. Impact sensors 98 are configured to detect the type, angle and severity of collisions. Accelerometers 97 and impact sensors 98 are configured to feed their detected information to the electronic controller unit 103, which analyzes and judges the information from these sensors, and immediately determines whether to trigger the airbag circuit and deploy the safety airbag 104 in the relevant parts to be properly inflated.

In an embodiment, the safety airbag includes a compressed air storage tank, an intake valve, an airbag, and a vent hole. The compressed air storage tank is configured to store an appropriate amount of compressed air having a certain pressure. The airbag is installed on the appropriate part of the seat frame and connected to the compressed air storage tank through an intake valve. The vent hole is that between the airbag and the atmosphere. The compressed air stored in the tank may be inflated into the airbag in a timely and appropriate amount through the opened intake valve under control. When the pilot body collides and squeezes the airbag with a certain pressure, the airbag starts to deflate through the vent to reduce the pressure in the airbag to help buffer the collision. Herein, airbags may be divided into front airbags, side airbags, upper backrest airbags, seat board airbags, and external airbags according to their placement positions.

During usage, the front airbags, side airbags, and upper backrest airbags are usually folded and installed on the front and sides of two armrests 38 and the upper end of the back board 36 (not shown in the figures), and may be quickly inflated, expanded, popped and deployed under control, from the front ends of two armrests 38 inward, from the sides of two armrests 38 to both sides, and from the upper end of back board 36 upward, for use to buffer the hit impact on pilot's body and head from the front, both sides and above during collision. The seat airbag is arranged on seat board 37 (not shown in the figures), and may be inflated and expanded into an air cushion of a certain thickness under control to buffer the impact on pilot's pelvis. The external airbags are installed outside the personal flying machine, may be deployed under control to cover hard areas such as compressed air supply device, and is designed to buffer and reduce the damages from collision between personal flying machine and pedestrians.

The emergency-rescue parachute system includes a parachute, a parachute opening rope, a compressed air jet engine for parachute expansion, and a compressed air balloon for accelerated parachute expansion.

Specifically, the parachute canopy and parachute ropes are folded and confined in a sealed parachute bag 85 with Velcro, arranged on the upper end of back board 36 (as shown in FIGS. 4 and 5). The upper end of back board 36 is provided with the overhead points (not shown in the figures), which are permanently connected with the ends of the parachute ropes, passing through the sealed parachute bag 85. The Velcro is opened when the compressed air jet engine for parachute expansion is launched. One end of the parachute opening rope is connected to the parachute, while another end to the compressed air jet engine for parachute expansion, which has a compact structure comprising a compressed air storage pipe, an intake pipe with controllable valves, an expansion chamber and a De-Laval nozzle. It is connected to be vertically movable to the rear of upper end of back board 36 (not shown in the figure). A waste gas tube for collecting the gas ejected from De-Laval nozzle is arranged vertically and directly beneath the De-Laval nozzle.

Once the controllable valve is opened in an emergency state, the compressed air in the compressed air storage pipes quickly enter the expansion chamber through the intake pipe to eject downward from the De-Laval nozzle along the discharge pipe, thereby driving the compressed air jet engine for parachute expansion to shoot upward into the air with the parachute opening rope, which pulls out the parachute from the sealed parachute bag 85 with Velcro opened and then lift it into the air. In sky, the parachute canopy expands under the action of air, and is inflated. There may be several compressed air balloons for accelerated parachute expansion (not shown in the figure), which are small spherical containers which have cases made of a light-weight and pressure-resistant material, and in which the compressed air is contained. The compressed air balloons for accelerated parachute expansion are arranged symmetrically on the inner side of the bottom edge of the canopy, respectively, and equipped with balloon valve for opening parachute toward the inner side of canopy. The balloon valve for opening parachute are opened when the parachute is pulled out of the sealed parachute bag 85. The compressed air in the parachute balloons is ejected into the canopy to accelerate and complete its opening. The rapidly opened canopy is an aerodynamic deceleration surface, with air resistance against its descent, which is transmitted to the personal flying machine through the parachute ropes with permanent connection between their ends and the overhead points of the personal flying machine to slow down its descent and land safely.

Furthermore, the control system in this embodiment includes a manual driving operation device and an automatic control system.

Specifically, referring to FIGS. 4 and 5, the manual driving operation device includes a raising pedal 86, a lowering pedal 87, a start-accelerator pedal 88, a decelerator-brake pedal 89, a left turn button 90 and a right turn button 91.

The raising pedal 86 and lowering pedal 87 are disposed on the left foot pedal bracket 54, wherein raising pedal 86 is arranged on the right side of the lowering pedal 87. When the pilot's left foot steps on raising pedal 86, the personal flying machine rises from the ground 49 or continues to ascend in the air; when the pilot's left foot steps on lowering pedal 87, the personal flying machine descends in the air or landed on the ground 49 from the air.

The start-accelerator pedal 88 and decelerator-brake pedal 89 are disposed on the right foot pedal bracket 55, wherein the start-accelerator pedal 88 is arranged on the right side of decelerator-brake pedal 89. When the pilot's right foot steps on start-accelerator pedal 88, the personal flying machine starts flying and accelerating in the air; when the pilot's right foot steps on decelerator-brake pedal 89, the personal flying machine decelerates or hovers in the air, and further stepping on the pedal allows the personal flying machine to fly backwards slowly.

The left turn button 90 and right turn button 91 are respectively disposed below the front ends of left and right armrests 38. When the left and right forearms of the pilot are respectively placed on the left and right armrests 38, the left and right hands are slightly bent naturally at the front ends of the left and right armrests 38, easily may touch the left turn button 90 and right turn button 91 below the front ends of the left and right armrests 38. When the pilot's left finger presses the left turn button 90, the personal flying machine will turn left in the air; when the pilot's right finger presses the right turn button 91, the personal flying machine turns right in the air.

Furthermore, the automatic control system of this embodiment includes an attitude balance feedback control system and an autopilot system.

Specifically, the attitude balance feedback control system includes attitude balance sensors, a computer center and compressed air jet engines for attitude control. Wherein, the attitude balance sensors transmit the information on the attitude imbalance of the personal flying machine that they detect to the computer center; the computer center analyzes and processes the information from the attitude balance sensors and issues corresponding instructions to correct the attitude imbalance of the personal flying machine in a timely manner to the compressed air jet engines 75 disposed around seat frame 2. They coordinate with each other to inject the respectively appropriate amounts of air at the right time, thus maintaining the balance of the personal flying machine in the air.

Furthermore, the autopilot system includes sensing facilities, a connection network and actuators. Among them, the sensing facilities includes sensors, global positioning system (GPS or Beodou) and inertial measurement unit (IMU), for collecting and processing the environmental information of the personal flying machine, as well as its positioning and heading information. The connection network includes the Internet of Things (IoT) of the personal flying machine, connected with the sensing facilities. IoT of the personal flying machine is a things-things connected internet in the personal flying machine and its ecosystem, for analyzing the data and information collected from the sensing facilities, designing the route of the personal flying machine, predicting the situations in a future period to decide the corresponding safety measures, performing the centralized management and control on personal flying machines flying in the air and giving corresponding instructions. The actuators include facilities to receive and execute instructions to automatically control the altitude, speed and steering of the personal flying machine, such that the personal flying machines automatically drive for taking off, fly along the route, and land safely at the destination in accordance with the instructions.

On the other hand, the present application also provides an operation method of a personal flying machine using compressed air as a power source, including the following steps:

S1, Pressurization and Inflation Step:

When the manifold outlet valve 70 is closed, the manifold inlet valve 68 is opened, and all of the valves on air storage pipes 59 are opened, sufficient high-pressure/ultra-high pressure compressed air is pressurized and inflated from "compressed air production, storage and supply mechanism" or "compressed air production/supply device" through the manifold air inlet 67 into the compressed air storage device 56.

S2, Pilot Ready Step:

The supporting legs 39 under the seat frame 2 are supported on the ground 49 at the takeoff site at the basic landing length. The pilot sits on seat board 37, with his/her back on back board 36, his/her shoulders and abdomen respectively tied with a pair of shoulder straps and an abdomen strap provided on back board 36, and his/her hips and legs respectively tied from his/her left and right groins with a pair of hip-leg straps provided on the seat board 37.

S3, Takeoff/Lift Step:

The pilot steps on raising pedal 86 with his/her left foot, and under control, a high-speed airflow 22 is ejected from in-duct compressed air artificial wind blowing ports 6 of stationary rotor lift device in a cyclone duct 1, horizontally towards the leading edge 16 of corresponding stationary blades 13 with a certain airfoil 14 and angle of attack 15. The compressed air high-speed airflow 22 relatively moves against stationary blade 13 to generate a lift 28, and an air column rotating at a high speed is formed in the cyclone cylinder 7. Due to the airflow downward slope 27 flowing through stationary blades 13 with a certain airfoil 14 and angle of attack 15, a high-speed spiral descending cyclone is formed in the air column rotating at a high speed. The additional stationary rotor 32 in cyclone cylinder 7 and in-duct fixed wings 33 increase the lift force in their relative movement against high-speed cyclone airflow. In cyclone cylinder 7, the lower pressure results from the high wind speed of the air column rotating at a high speed to generate a lift force to a certain extent from the outside atmosphere, and the reaction force of the cyclone airflow discharged downward from the gradually widening lower opening 8 also gives the gradually widening lower opening 8 with a certain lift force. Then under control, the compressed air may, through opening inflation valve 51, enter the upper part of inner cavity of cylinder type sleeve 46 to cause the air pressure of the upper part of inner cavity of cylinder type sleeve 46 over piston 47 to rise sharply, such that the overlapping of the piston rod type column 45 and the cylinder type sleeve 46 decrease, and the total length of supporting legs 39 increase until their overlapping is the least while the supporting legs reach the longest in total length, thereby pushing up cylinder type sleeve 46 and main part of the personal flying machine to ascend rapidly, playing a role of "take-off assistance" as mentioned above to assist the lift generated by stationary rotor lift device in a cyclone duct 1, thus pushing up the personal flying machine to take off and ascend with the longest supporting legs. The pilot, when required, steps with his/her left foot alternately on raising pedal 86 or lowering pedal 87 to control stationary rotor lift device in a cyclone duct 1 to eject high-speed airflow 22 from in-duct compressed air artificial wind blowing ports 6 horizontally towards the leading edge 16 of corresponding stationary blades 13 with a certain airfoil 14 and angle of attack 15, to maintain a relatively stable wind rate and speed, as well as the lift force of stationary rotor lift device in a cyclone duct 1, such that the personal flying machine may be relatively stable at an appropriate height. During the takeoff/ascending process, the attitude balance sensors transmits the information on attitude imbalance of the personal flying machine to the computer center in time, the computer center issues the corresponding instructions to the compressed air jet engines 75 around seat frame 2 to coordinate with each other to eject the respectively appropriate amounts of air at the right time, thereby maintaining the balance of the personal flying machine in the air. At the same time, clockwise in-duct cyclone stationary rotor lift arrangement 29 and counterclockwise in-duct cyclone stationary rotor lift arrangement 30 installed on the left and right sides of seat frame 2 respectively and symmetrically, are in torque balance. The attitude balance and torque balance mentioned above are maintained throughout the whole process of flight.

S4, Target Direction Flight Step:

When the personal flying machine reaches an appropriate height, pilot's right foot steps on the start-accelerator pedal 88, and both left-rear jet engine 81 and right-rear jet engine 83 are turned on (while left-front jet engine 82 and right-front jet engine 84 off) under control to generate a resultant force pushing the personal flying machine forward, to start accelerating the forward flight in the air. The pilot allows the personal flying machine accelerate, decelerate, ascend, descend, turn left and right during the flight by operating the start-accelerator pedal 88, the decelerator-brake pedal 89, the raising pedal 86, the lowering pedal 87, the left turn button 90 and the right turn button 91, so that the left-rear jet engine 81, the left-front jet engine 82, the right-rear jet engine 83, right-front jet engine 84, and plurality of down jet engines 92 arranged beneath seat frame 2 work individually or in cooperation to generate the corresponding thrust or resultant force for the personal flying machine to fly toward the sky above the destination.

S5, Hovering and Landing Step:

When the personal flying machine is approaching the sky above the destination, the pilot steps on decelerator-brake pedal 89 with his/her right foot, left-rear jet engine 81 and right-rear jet engine 83 are turned off while left-front jet engine 82 and right-front jet engine 84 are turned on to generate a combined force pushing the personal flying machine backwards to buffer the inertia of the personal flying machine continuing to move forward, which plays effects of deceleration and braking, thereby gradually decelerating the personal flying machine to fly forward in the air until it hovers in the air over the destination.

The pilot steps on lowering pedal 87 with his/her left foot, and under control, the volume and speed of the artificial wind ejected from in-duct compressed air artificial wind blowing ports 6 of stationary rotor lift device in a cyclone duct 1 horizontally towards the leading edge 16 of corresponding stationary blades 13 with a certain airfoil 14 and angle of attack 15 are gradually reduced. The lift 28 generated by the relative movement of the artificial wind airflow and the stationary blade 13 is gradually reduced, and so are the volume and speed of cyclone, rotating air column and spiral descending cyclone formed in cyclone cylinder 7, and so is the effect of increased lift resulting from additional stationary rotor 32 in cyclone cylinder 7 and in-duct fixed wings 33. The air pressure in the cyclone cylinder 7 gradually rises so that the lifting force given by the atmosphere is gradually reduced. The volume and speed of the cyclone airflow discharged downward from gradually widening lower opening 8 are gradually decreased, and so is the reaction force generated therefrom, and so is the lift force toward gradually widening lower opening 8, thereby making the personal flying machine to begin descending in the air over the destination.

During the personal flying machine with the longest supporting legs descends in the air above the destination, when ground end of supporting leg 48 of the longest supporting legs touches the ground, the continuous downward movement of piston rod type column 45 is directly halted by ground 49 at once. However, the continuous downward movement of cylinder type sleeve 46 and main body of the personal flying machine above is not directly blocked by the ground 49 immediately. The continuously downward movement of the cylinder type sleeve 46 makes the part of piston rod type column 45 beyond end port 53 retracted into the inner cavity of cylinder type sleeve 46 through end port 53, so that the overlapping of piston rod type column 45 and cylinder type sleeve 46 increases again and the total length of supporting legs 39 decreases. The inner cavity of cylinder type sleeve 46 over piston 47 keeps shrinking to make the air pressure continue to increase. At the same time, exhaust valve 52 is opened so that the pressure in the inner cavity of cylinder type sleeve 46 will not suddenly become too high, but to form a buffer resistance to the downward movement of cylinder type sleeve 46 and the main body of the personal flying machine above, which plays the role of the aforementioned "landing buffer", until the personal flying machine is supported with the basic landing length supporting legs on the destination ground 49.

In addition, it should be understood that, in an alternative embodiment of the present application, steps S3 to S5 described above may also be executed by the autopilot system described above.

The device embodiments described above are merely illustrative, where the units described as separate components may or may not be physically separated, and the components displayed as units may or may not be physical units, that is, they may be located in one place, or distributed on multiple network units. Some or all of the modules can be selected according to actual needs to achieve the objectives of the solutions of the embodiments. Those of ordinary skill in the art can understand and implement without creative work.

Finally, it should be noted that the embodiments above are only used to illustrate the technical solutions of the present application, but not to limit them; although the present application has been described in details with reference to the foregoing embodiments, those of ordinary skill in the art should understand that the technical solutions recorded in the foregoing embodiments can still be modified, or some of the technical features thereof can be equivalently substituted; such modifications or substitutions do not cause the essence of the corresponding technical solutions to deviate from the scope of the technical solutions of the embodiments of the present application.

What is claimed is:

1. A machine for generating lift using compressed air as a power source, comprising:
   a cyclone duct extending from an upper part to a lower part;
   a stationary rotor lift device in the cyclone duct;
   a seat frame; and
   a compressed air supply device,
   wherein the stationary rotor lift device in the cyclone duct and the compressed air supply device are respectively installed on the seat frame,
   wherein the stationary rotor lift device comprises:
      an in-duct stationary rotor; and
      in-duct compressed air artificial wind blowing ports,
      wherein the in-duct stationary rotor and the in-duct compressed air artificial wind blowing ports are fixedly installed in the cyclone duct in a same working horizontal section,
   wherein the in-duct stationary rotor comprises:
      a stationary propeller hub; and
      a plurality of stationary blades fixedly connected around the stationary propeller hub and arranged radially,
   wherein each of the plurality of stationary blades is shaped like a wing and comprises:
      an airfoil;
      an angle of attack;
      a leading edge; and
      a trailing edge,
   wherein the trailing edge of each stationary blade is opposite to the leading edge of another stationary blade, and
   wherein the stationary rotor lift device in the cyclone duct is fixedly installed on each of both sides of the seat frame in a symmetrical and torque-balanced manner, and the compressed air supply device is configured to supply compressed air to the in-duct compressed air artificial wind blowing ports, so that the in-duct compressed air artificial wind blowing ports are configured to eject airflows toward the leading edge of the stationary blade in a spiral downward through the cyclone duct for discharging the airflows from the lower part of the cyclone duct.

2. The machine according to claim 1,
   wherein the cyclone duct is a gas channel comprising a cyclone cylinder and a gradually widening lower opening and vertically arranged on each of two sides of the seat frame,
   wherein in the cyclone cylinder, outer peripheral ends of the stationary blades are fixedly connected to a cyclone cylinder inner wall; the cyclone cylinder is provided therein with a lift-increasing device which comprises a plurality of additional stationary rotors and in-duct fixed wings, and the additional stationary rotors and the in-duct fixed wings are respectively fixedly arranged on the cyclone cylinder inner wall between the in-duct stationary rotor and the gradually widening lower opening.

3. The machine according to claim 2,
   wherein the seat frame comprises:
   a back board;
   a seat board;
   two armrests; and
   a plurality of supporting legs,
   wherein the back board is provided on a back side with a buckle mechanism for installing the compressed air supply device, on a front side with shoulder straps and abdominal straps for binding a human body to the back board, and a bottom of the back board is connected with the seat board;
   wherein said two armrests are provided, and a rear end of each of said two armrests is rotatably connected with both sides of the back board or the seat board;
   wherein the plurality of supporting legs respectively extend downward and outward from a lower part of the back board or the seat board.

4. The machine according to claim 3,
   wherein each supporting leg comprises a piston rod type column and a cylinder type sleeve sleeved on the piston rod type column;
   wherein an upper end of the piston rod type column is a piston which is slidable in the cylinder type sleeve, and a lower end of the piston rod type column is a ground end of each supporting leg, and an upper end of a cylinder wall of the cylinder type sleeve is connected to the lower part of the back board or the seat board through a movable joint;
   an upper end of an inner cavity of the cylinder type sleeve is provided with an inflation valve and an exhaust valve, and a lower end of the inner cavity of the cylinder type sleeve is provided with an end port for allowing the piston rod type column to smoothly extend into or out of the cylinder type sleeve and restraining the piston from sliding out and the piston rod type column moves up and down with the piston in the cylinder type sleeve; wherein a left foot pedal bracket and a right foot pedal bracket are respectively provided on left and right sides of a lower end of the cylinder type sleeve of a front supporting leg extending forward and downward;

wherein the compressed air supply device is connected with the inflation valve to supply compressed air to the cylinder type sleeve.

5. The machine according to claim 4, wherein the compressed air supply device comprises a compressed air storage device;

wherein the compressed air storage device comprises a plurality of air storage pipes, and manifolds located at both ends of the air storage pipes, one end of each air storage pipe is provided with a pipe inlet and a pipe inlet valve, and the other end of each of the air storage pipes is provided with a pipe outlet and a pipe outlet valve;

wherein the manifold communicating with the pipe inlets of the plurality of air storage pipes is an inlet manifold, and the manifold communicating with the pipe outlets of the plurality of air storage pipes is an outlet manifold;

wherein the inlet manifold is provided with a manifold air inlet and a manifold inlet valve, and the outlet manifold is provided with a plurality of manifold air outlets and a plurality of manifold outlet valves.

6. The machine according to claim 5, wherein the compressed air supply device further comprises all compressed air transmission passages communicating with the compressed air storage device, and a compressed air exhaust device communicating with the compressed air transmission passages;

wherein the compressed air transmission passages comprise a decompression chamber, connecting pipes and a check valve; the connecting pipes and the check valve are arranged between the compressed air storage device and the decompression chamber, between the adjacent decompression chambers, between the decompression chamber and the compressed air exhaust device, and between the decompression chamber and the cylinder type sleeve for one-way transmission of compressed air.

7. The machine according to claim 6, wherein the compressed air exhaust device comprises a compressed air artificial wind exhaust device;

wherein the compressed air artificial wind exhaust device is sequentially provided with an expansion chamber, a convergent-divergent tube and a wind-blowing pipe from top to bottom; the expansion chamber has an inner diameter larger than the pipe diameter of the connecting pipe connected thereto, the expansion chamber is provided with a gas injection regulator on an inner wall thereof, and the gas injection regulator is configured to regulate the pressure and flow rate of the compressed air injected into the expansion chamber from the connecting pipe and the check valve, and the wind-blowing pipe is divided into several sub-tubes surrounding the periphery of the cyclone cylinder to deliver the air flow to the in-duct compressed air artificial wind blowing ports; wherein each of the in-duct compressed air artificial wind blowing ports comprises a plurality of horizontally expanded orifices for compressed air artificial wind which eject air flows horizontally towards the leading edge of the corresponding stationary blade.

8. The machine according to claim 7, wherein the compressed air exhaust device further comprises a plurality of compressed air jet engines;

wherein each of the compressed air jet engines comprise a compressed air expansion chamber and a jet engine de-Laval nozzle; the compressed air expansion chamber is configured to receive compressed air transmitted from the connecting pipe and the check valve, and generate thrust by a reaction force of high-speed air flows ejected from orifices of the jet engine de-Laval nozzle; wherein the compressed air jet engines comprise a left-rear jet engine, a left-front jet engine, a right-rear jet engine, and a right-front jet engine that are arranged on left and right sides of the seat frame to eject air backward and forward respectively, and several down jet engines which are arranged under the seat frame to eject air downward.

9. The machine according to claim 8, further comprising safety equipment comprising:

a compressed air safety airbag system; and an emergency-rescue parachute system;

wherein the compressed air safety airbag system comprises:

sensors;

an electronic controller unit; and a safety airbag;

wherein the sensors comprise accelerometers configured to detect the change in speed of the personal flying machine using compressed air as a power source and impact sensors configured to detect the type, angle and severity of a collision, and the accelerometers and the impact sensors are communicatively connected to the electronic controller unit and are configured to feed detected information to the electronic controller unit; the electronic controller unit is configured to analyze and judge the information to determine whether to deploy inflation of the safety airbag; the safety airbag system is arranged on the seat frame;

wherein the emergency-rescue parachute system comprises:

a parachute;

a parachute opening rope;

a compressed air jet engine for parachute expansion;

compressed air balloons for accelerating parachute expansion; and a canopy;

wherein the canopy and the opening rope of the parachute are configured to be folded and installed in a sealed parachute bag with a hook and loop fastener, configured to be arranged on an upper end of the back board, and the upper end of the back board is provided with a hanging point connected with an end of the opening rope of the parachute passing through the sealed parachute bag;

one end of the parachute opening rope is connected to the parachute, and the other end of the parachute opening rope is connected to the compressed air jet engine for parachute expansion;

the compressed air jet engine for parachute expansion is configured to be controlled to shoot upward to guide the parachute opening rope to be lifted into the air, and the parachute opening rope is configured to pull the parachute out of the opened sealed parachute bag and lifts the parachute into the air;

the compressed air balloons for accelerating opening of the parachute are respectively arranged on an inner side of a bottom edge of the canopy, when the parachute is pulled out of the sealed parachute bag and lifted into the air, and the compressed air in the compressed air balloons for accelerating parachute expansion is configured to be injected into the canopy to accelerate the opening of the parachute.

10. The machine according to claim 9, further comprising:
a control system configured to control the operation of the safety equipment, and including a manual driving operation device and an automatic control system;
wherein the manual driving operation device comprises a raising pedal, a lowering pedal, a start-accelerator pedal, a deceleration-brake pedal, a left-turn button and a right-turn button;
wherein the raising pedal and the lowering pedal are arranged on the left foot pedal bracket, the start-accelerator pedal and the deceleration-brake pedal are arranged on the right foot pedal bracket, and the left-turn button and the right-turn button are respectively arranged below front ends of the armrests on the left and right sides;
wherein the automatic control system comprises an attitude balance feedback control system and an autopilot system, while the attitude balance feedback control system comprises an attitude balance sensor, a computer center, and a compressed air jet engine for attitude control that cooperate with each other;
wherein the autopilot system comprises:
a sensing device;
a connection network system; and
an actuator, and
wherein the sensing device comprises a sensor, a global positioning system, and an inertial measurement unit and is configured to collect and process the environmental information, positioning and heading information of the personal flying machine using compressed air as a power source; the connection network comprises an Internet of Things (IoT) system of personal flying machine to which the sensing device is accessed; the actuator comprises facilities capable of receiving and executing instructions to automatically control the altitude, speed and steering of the personal flying machine using compressed air as a power source,
wherein the IoT system is a system connected to the internet for analyzing data and information collected from the sensing device, designing a route of the personal flying machine, predicting a situation in a future period to decide a corresponding safety measure, performing a centralized management and control on the personal flying machine flying.

11. A method of operating the machine according to claim 4, the method comprising:
inflating the compressed air supply device with compressed air;
controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;
driving and controlling the personal flying machine using compressed air as a power source to maintain a balanced attitude, fly to a destination and/or hover over the destination; and
gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

12. A method of operating the machine according to claim 5, the method comprising:
inflating the compressed air supply device with compressed air;
controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;
driving and controlling the personal flying machine using compressed air as a power source to maintain a balanced attitude, fly to a destination and/or hover over the destination; and
gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

13. A method of operating the machine according to claim 6, the method comprising:
inflating the compressed air supply device with compressed air;
controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;

driving and controlling the personal flying machine using compressed air as a power source to maintain a balanced attitude, fly to a destination and/or hover over the destination; and gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

14. A method of operating the machine according to claim 7, the method comprising:

inflating the compressed air supply device with compressed air;

controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;

driving and controlling the personal flying machine using compressed air as a power source to maintain a balanced attitude, fly to a destination and/or hover over the destination; and gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

15. A method of operating the machine according to claim 8, the method comprising:

inflating the compressed air supply device with compressed air;

controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;

driving and controlling the personal flying machine using compressed air as a power source to maintain a balanced attitude, fly to a destination and/or hover over the destination; and gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

16. A method of operating the machine according to claim 9, the method comprising:

inflating the compressed air supply device with compressed air;

controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;

driving and controlling the personal flying machine using compressed air as a power source to maintain a balanced attitude, fly to a destination and/or hover over the destination; and gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

17. A method of operating the machine according to claim 10, the method comprising:

inflating the compressed air supply device with compressed air;

controlling the compressed air supply device to supply compressed air to the in-duct compressed air artificial wind blowing ports, so that the in-duct compressed air artificial wind blowing ports eject airflows towards the leading edge of the stationary blade to form a cyclone in the cyclone cylinder, making the stationary rotor lift device in a cyclone duct generate lift to drive the personal flying machine using compressed air as a power source to take off; meanwhile, allowing the compressed air to enter an upper part of the inner cavity of the cylinder type sleeve, and push the piston down to make the piston rod type column extend downward out of the cylinder type sleeve to assist in pushing the personal flying machine using compressed air as a power source to be lifted into the air;

driving and controlling the personal flying machine using compressed air as a power source to maintain a balanced attitude, fly to a destination and/or hover over the destination; and gradually decreasing the volume and speed of artificial winds ejected by the in-duct compressed air artificial wind blowing ports, so that the lift of the stationary rotor lift device in a cyclone duct decreases gradually, and the personal flying machine using compressed air as a power source starts to descend; when the ground end of each supporting leg is grounded, the piston rod type column pushes up the piston, causing the piston to move towards a top of the inner cavity of the cylinder type sleeve and allowing the exhaust valve to be opened for landing and buffering.

* * * * *